United States Patent [19]

Hamano et al.

[11] Patent Number: 4,771,282
[45] Date of Patent: Sep. 13, 1988

[54] TERMINAL FOR DATA TRANSMISSION SYSTEM

[75] Inventors: Fumio Hamano, Katsuta; Shigeru Oho, Hitachi; Takeshi Hirayama, Mito; Akira Hasegawa, Katsuta, all of Japan

[73] Assignee: Hitachi, Ltd., Tokyo, Japan

[21] Appl. No.: 110,031

[22] Filed: Oct. 14, 1987

Related U.S. Application Data

[63] Continuation of Ser. No. 652,477, Sep. 20, 1984, abandoned.

[30] Foreign Application Priority Data

Sep. 21, 1983 [JP] Japan ............... 58-173244

[51] Int. Cl.⁴ .................................. H04Q 1/00
[52] U.S. Cl. .................... 340/825.22; 340/825.06; 340/825.07
[58] Field of Search .............. 340/825.06, 825.07, 340/825.16, 825.22, 825.52, 52 F; 370/85, 29; 455/606, 607; 371/14; 364/424, 431.03, 431.12

[56] References Cited

U.S. PATENT DOCUMENTS

| | | | |
|---|---|---|---|
| 4,461,003 | 7/1984 | Tamaki | 371/14 |
| 4,538,262 | 8/1985 | Sinniger et al. | 370/85 |
| 4,604,620 | 8/1986 | Oho et al. | 340/825.52 |
| 4,654,890 | 3/1987 | Hasegawa et al. | 370/85 |

Primary Examiner—John W. Caldwell, Sr.
Assistant Examiner—Edwin C. Holloway, III
Attorney, Agent, or Firm—Antonelli, Terry & Wands

[57] ABSTRACT

A terminal device for a multiplexed data transmission system has a decoder matrix having plural groups of function setting inputs for selecting plural types of functions such as interface, operation modes and other. One group of the function setting inputs are preferably address designating signals which are utilized for determining the interface. The other group of the function setting inputs determines various additional functions such as, for example, enabling/disabling of fail-safe function and automatic transmission function. Selection with the aid of the matrix allows selection of a large number of functions with a small number of input signals. Utilization of the address signals to this end allows the number of terminal pins to be decreased to a minimum.

8 Claims, 18 Drawing Sheets

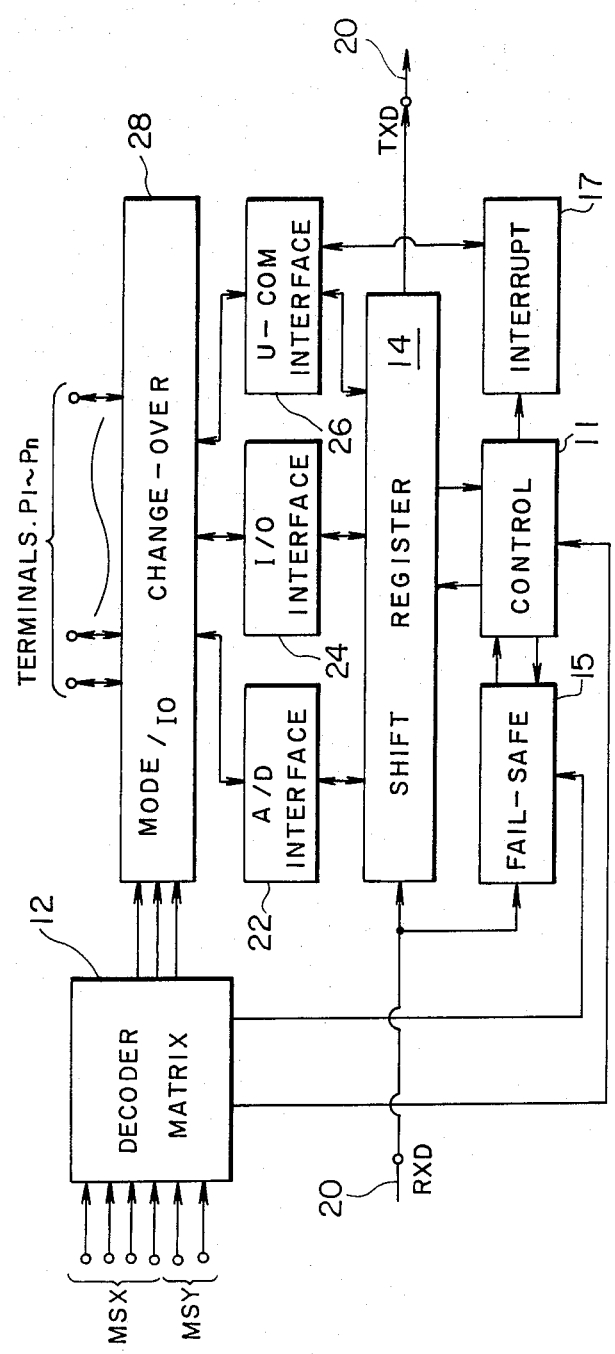

STATUS TRANSITION OF CIM

FIG. 5B

| MODE SELECT MSI / MS0 | ADDRESS INTERFACE | 0 MPU | 1~D DIO | E | F |
|---|---|---|---|---|---|
| | | | | AD | |
| 0 / 0 | | MPU CNTLD BUS-COMPATIBLE F/S DISABLED | PASSIVE ADDR CNTLD IO F/S DISABLED | PASSIVE FIXED IO (5+5) F/S DISABLED | PASSIVE FIXED IO (5+5) F/S DISABLED |
| 0 / 1 | TEST1 | | PASSIVE ADDR CNTLD IO F/S ENABLED | PASSIVE FIXED IO (5+5) F/S ENABLED | PASSIVE FIXED IO (5+5) F/S ENABLED |
| 1 / 0 | TEST2 | | ACTIVE ADDR CNTLD IO F/S DISABLED | PASSIVE ALIN (13+1) F/S DISABLED | PASSIVE ALIN (13+1) F/S ENABLED |
| 1 / 1 | TEST3 | | ACTIVE ADDR CNTLD IO F/S ENABLED | PASSIVE AL OUT(1+13) F/S ENABLED | PASSIVE AL OUT(1+13) F/S DISABLED |

FIG. 5C

| BIT NO | MPU MODE | DIO MODE | AD MODE | |
|---|---|---|---|---|
| 0 | D0 ⎫ | "0" ⎫ | AD0 ⎫ | |
| 1 | D1 | "0" | AD1 | |
| 2 | D2 | "0" ⎬ UNUSED | AD2 | |
| 3 | D3 ⎬ MPU DATA | "0" | AD3 ⎬ AD DATA | |
| 4 | D4 (REG. 3, 8 BITS) | "0" | AD4 (8 BITS) | |
| 5 | D5 | "0" ⎭ | AD5 | |
| 6 | D6 | DIO ⎫ | AD6 | |
| 7 | D7 ⎭ | DIO | AD7 ⎭ | |
| 8 | D0 ⎫ | DIO | ADCH0 ⎫ AD | |
| 9 | D1 | DIO | ADCH1 ⎬ CHANNEL | |
| 10 | D2 | DIO | DIO ⎫ | |
| 11 | D3 ⎬ MPU DATA | DIO | DIO | |
| 12 | D4 (REG. 2, 8 BITS) | DIO ⎬ DIO DATA | DIO | |
| 13 | D5 | DIO (14 BITS) | DIO | |
| 14 | D6 | DIO | DIO ⎬ DIO DATA | |
| 15 | D7 ⎭ | DIO | DIO (10 BITS) | |
| 16 | D0 ⎫ | DIO | DIO | |
| 17 | D1 | DIO | DIO | |
| 18 | D2 | DIO | DIO | |
| 19 | D3 ⎬ MPU DATA | DIO ⎭ | DIO ⎭ | |
| 20 | D4 (REG. 1, 8 BITS) | ADDR0 ⎫ | ADDR0 ⎫ | |
| 21 | D5 | ADDR1 ⎬ ADDRESS | ADDR1 ⎬ ADDRESS | |
| 22 | D6 | ADDR2 ⎬ DATA | ADDR2 ⎬ DATA | |
| 23 | D7 ⎭ | ADDR3 ⎭ | ADDR3 ⎭ | |
| 24 | "1" START BIT | "1" START BIT | "1" START BIT | |

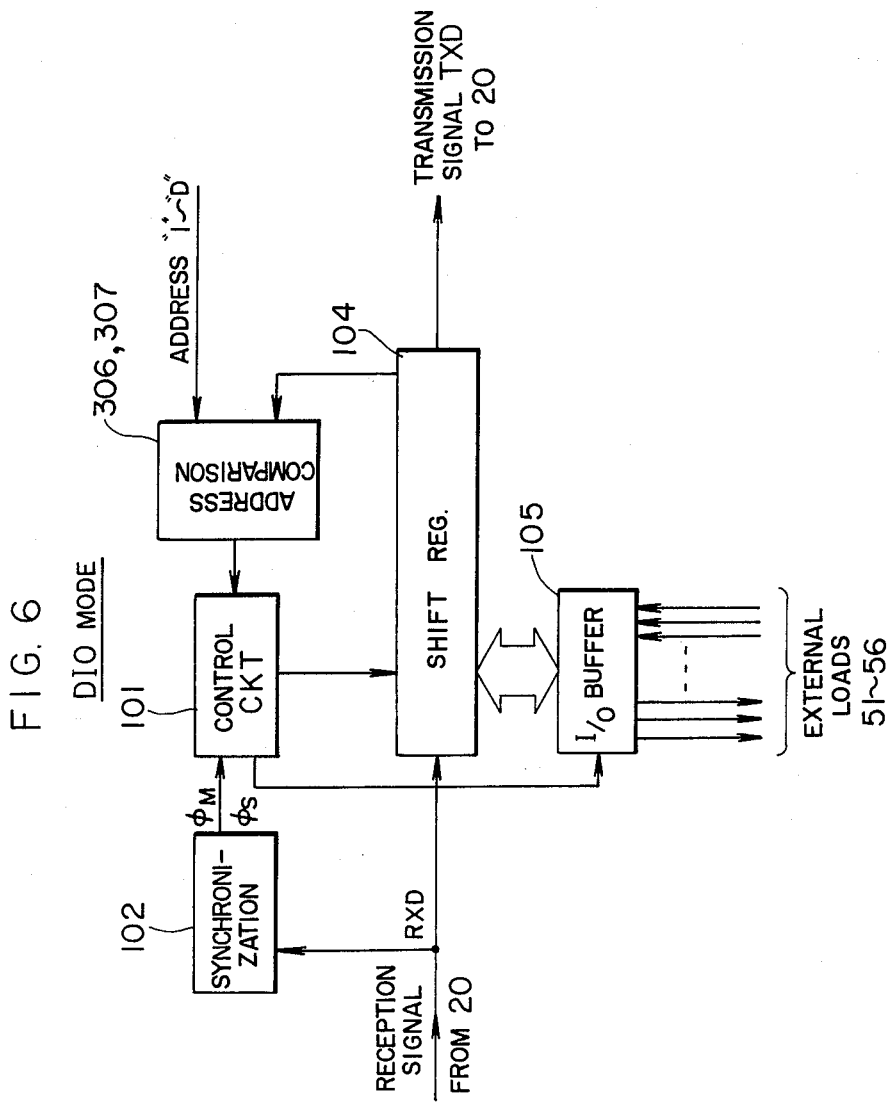

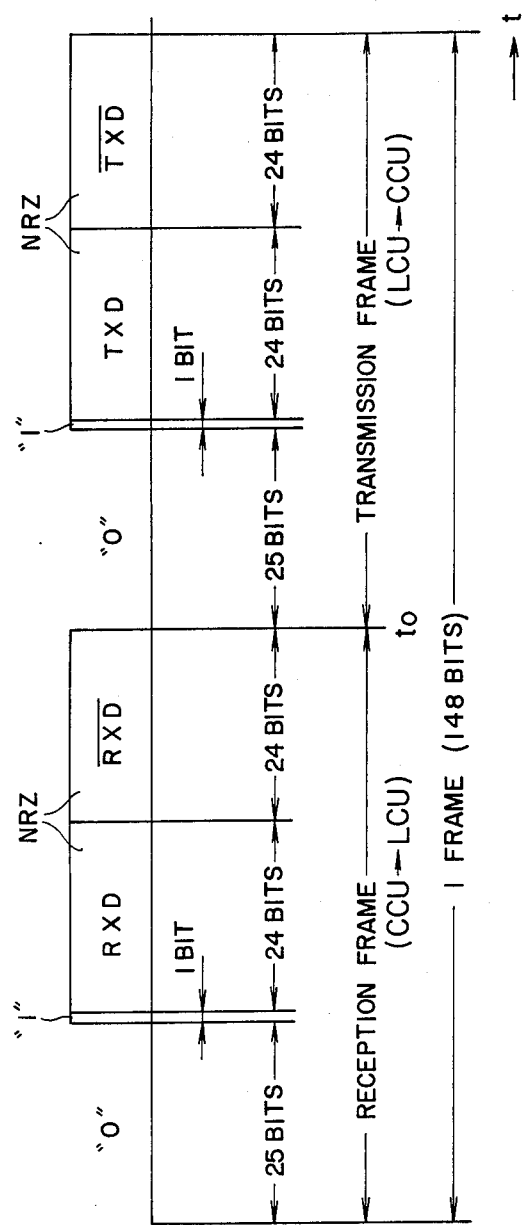

AUTO

TERMINAL FOR DATA TRANSMISSION SYSTEM

This application is a continuation of application Ser. No. 652,477, filed Sept. 20, 1984 now abandoned.

The present invention relates generally to a communication terminal device which is destined for use in a multiplexed data transmission system, and more particularly to a terminal or local control apparatus having a construction which allows a number of terminals of an identical structure to constitute a data transmission system, wherein the operation modes of the individual terminals can be arbitrarily selected.

There are many structures or apparatus such as automobiles, aircraft, ships, robots, measuring instruments and the like which are equipped with a large number of various electrical and/or electronic devices or units, such as various types of lamps and motors, as well as control devices, such as different types of sensors, actuators and the like. The number of such electrical/electronic devices tends to increase more and more, as improvements in the apparatus such as mentioned above are effected.

Thus, if those large number of electric/electronic devices or units are individually and separately wired, the wiring procedure or system would become very complicated, involving a great member of wires, which gives rise to serious problems, such as an increase in the cost, weight and occupied space within the apparatus. Further, difficulty such as mutual interferences will be encountered, resulting in added disadvantages.

As one of the measures for solving the above problems, there has been proposed a multiplexed transmission system which enables the transmission of a large amount of data, information or signals with a small amount of wirings. An example of such multiplexed wiring system is disclosed in Japanese patent application No. 17535/82 (corresponding to U.S. patent application Ser. No. 464,212 now U.S. Pat. No. 4,604,620) filed by the same assignee of the present application.

In the multiplexed wiring system under consideration, a number of local control units (referred to as LCU) are usually operated under the command of a central control unit (referred to as CCU). To this end, each of the units requires a communication interface module (referred to as CIM) for transmission and reception of data (i.e. data exchange or transaction). Functions required to be performed by the individual units differ from one to another. In this connection, it is not desirable from the practical viewpoint of economy, maintenance and other standpoints to provide single-application-only or specific purpose semiconductor CIMs each designed to meet the specific requirements allotted to it. In other words, it is desirable to provide a CIM which can selectively execute numerous functions. However, in order to allow the various functions to be performed selectively by the CIM, the number of selecting signals and hence the number of pins to be installed on a LSI (large scale integrated circuit) constituting the CIM will necessarily be increased correspondingly. In particular, an increase in the number of pins is undesirable for the CIM LSI. Thus, there exists a great demand for the CIM LSI which can realize many desired functions with the number of pins being retained as small as possible (e.g. 28 pins).

Accordingly, it is an object of the present invention to provide a communication terminal device which can be realized in an integrated circuit configuration for selectively realizing a number of various functions with an increase in the number of required pins being suppressed to a minimum.

Another object of the present invention is to provide a communication terminal device which has two types of function selecting inputs, wherein the function to be executed is selectively determined in dependence on a matrix or combination of the two types of inputs.

Adoption of a matrix configuration (matrix-like input combinations) is effective for reducing the number of pins.

With regard to the two types of the function setting inputs, it is desirable that one type of input be employed for establishing the basic or fundamental connection configuration of the terminal device. In that case, the other type of input may be used to impart a variation to the basic connection configuration. Since the basic connection configuration determines the basic or fundamental nature of the terminal device, another signal such as an address signal may be used to serve also as the input signal mentioned above.

The other of the two types of function or mode setting inputs may be a signal which serves to additionally impart a given one of various optional functions to the communication terminal device. Among the optional functions, there may be mentioned a fail-safe function, automatic transmission function and so forth.

These and other objects, features and advantages of the present invention will be more apparent upon consideration of the following description of various preferred embodiments of the invention taken in conjunction with the accompanying drawings, in which:

FIGS. 3A to 3C are views for illustrating the concept of the CIM according to the present invention, wherein FIG. 3A is a block diagram, FIG. 3B is a status transition diagram and FIG. 3C is a partial wiring diagram;

FIGS. 5A to 5C are diagrams showing, respectively, an input terminal array, a mode table and data bit structures, for illustrating the mode setting operation;

FIG. 6 shows a functional block diagram for illustrating a connection configuration in a data input/output (DIO) mode;

FIG. 7 is a view illustrating an example of transmission waveform;

FIG. 1 shows a wiring diagram of a multiplexed transmission system applied to an automobile or car.

Figure 1:
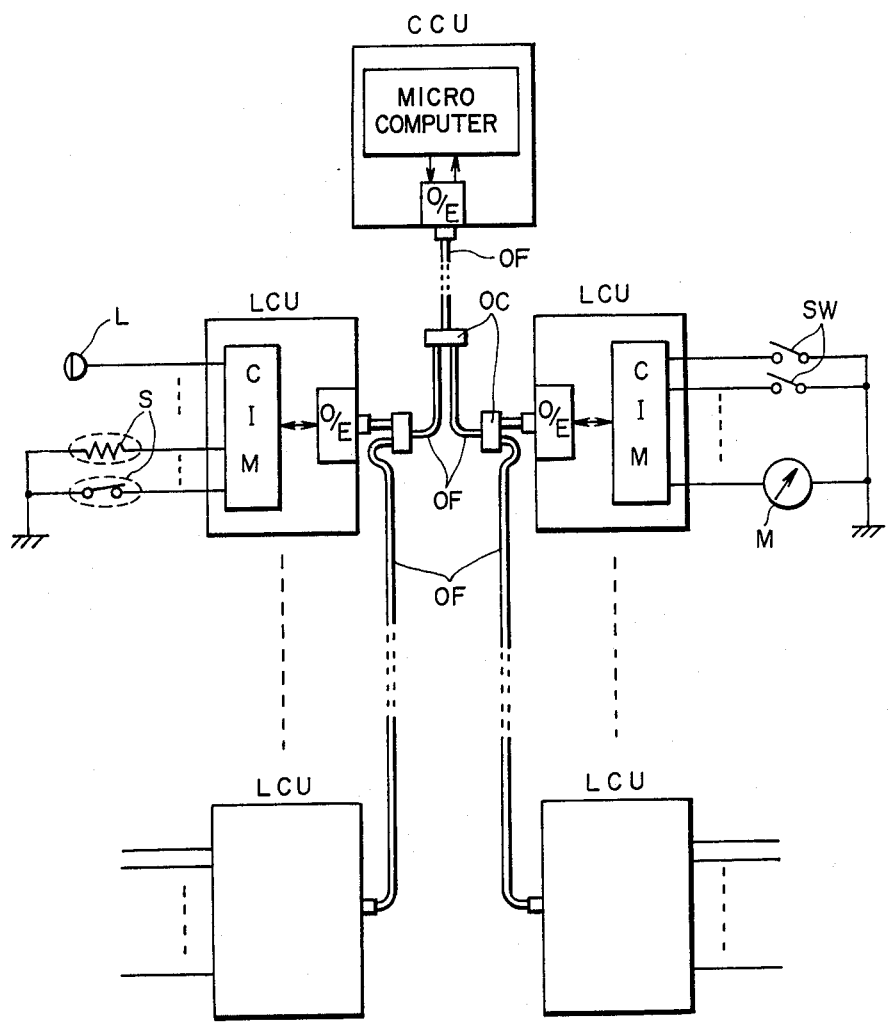
FIGS. 1 and 2 are schematic views for illustrating examples of a data transmission system in which CIMs (i.e. communication interface module) are employed.

In the multiplexed transmission system illustrated in FIG. 1, a central control unit is coupled in common to a plurality of local control units through optical signal channels provided by optical fiber cables OF which serve as signal transmission paths or lines. An optical branching connector OC is disposed at each of the branching points of the optical fiber cable OF.

The CCU is disposed at a location near the dashboard of the automobile or other appropriate location and performs an overall system control.

A predetermined number of LCUs are distributedly disposed at locations in the vicinity of associated electric devices of the automobile, such as various control switches SW, meters M, lamps L, sensors S, and others.

A bi-directional or bilateral opto-electrical conversion module O/E for converting an optical signal to an electrical signal or vice versa is provided at each coupling point of the CCU and the LCU to the optical fiber cable OF.

The CCU includes a digital computer and is capable of performing data communication functions. On the other hand, each of the local control units or LCUs is provided with a communication interface module or CIM.

The CCU sequentially selects one of the LCUs, exchanges data with the selected LCU and repeats the above operation, whereby multiplexed transmission is accomplished through one channel of optical fiber cable OF. Thus, the complicated and large scale wiring for the intra-car system as required heretofore can be replaced by a much more simplified one.

An example of the data transmission system realized by the intra-car multiplexed wiring system mentioned above is shown in FIG. 2.

Figure 2:
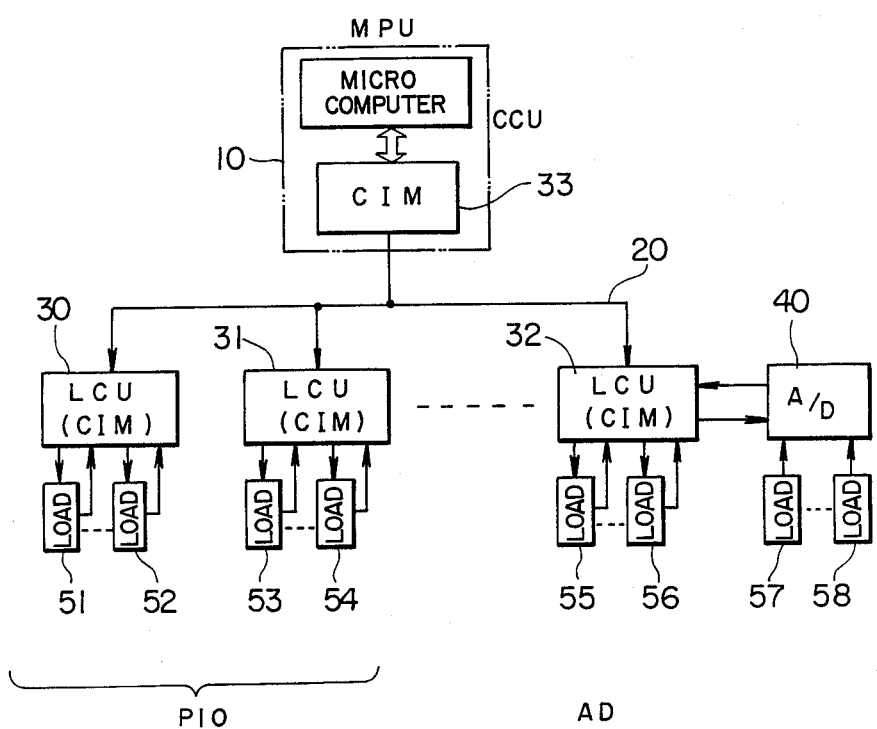

More specifically, FIG. 2 is a block diagram illustrating a general arrangement of a whole data transmission system. In the figure, a reference numeral 10 denotes a central processing unit (corresponding to the CCU shown in FIG. 1), a numeral 20 denotes a signal transmission line (corresponding to the optical fiber cable OF shown in FIG. 1), numerals 30 to 32 denote terminal control units (corresponding to the LCU shown in FIG. 1), numeral 40 denotes an analogue-to-digital or A/D converter and numeral 51 to 58 denote external loads. In the instant example under consideration, the signal transmission line 20 is assumed to be constituted by an electrical signal transmission line. Accordingly, no optoelectric conversion module is required for the CCU 10 and the LCUs 30, 31 and 32. Accordingly, each of the LCUs 30 to 32 is assumed to be constituted essentially by the CIM.

The CCU 10 including the digital computer (e.g. microcomputer) is coupled to the LCUs 30, 31, 32 through the transmission line 20, and sends out data to the external loads 51-58 which are constituted by electric/electronic devices, such as various types of sensors, lamps, actuators, motors and other devices and fetches data therefrom on a multiplexed transmission basis. The external loads 57 and 58, such as sensors for producing analog data outputs, are coupled to the associated LCUs 32 through the A/D converter 40 so that the data can be transmitted in digital signal form.

The signal transmission line 20 may be of any bilateral or duplex transmission type and is not limited to the electrical signal transmission path. For example, an optical signal transmission path constituted by the optical fiber and O/E converter or any other suitable transmission path may be used. The communication mode is a so-called half duplex mode in which data transmission and reception are alternately performed through the transmission path 20 between one of the LCUs 30, 31, 32 and the CCU 10 in response to a call from the CPU 10 to the selected one of the LCUs 30, 31 and 32.

Because of the multiplexed transmission in the half duplex mode, each data message sent out by the CCU 10 is provided with a destination (LCU) identifying address, whereby only one of the LCUs that identifies the received destination address as its own address makes response to the incoming data.

In this way, the data transmission in the half duplex mode is accomplished by such operation of the LCUs in which only one of the LCUs that identifies the address attached to the data sent from the CCU 10 as its own address responds, to thereby send in turn its own data to the CCU 10, as described above.

In the case of the illustrative embodiment now being considered, the functions of the LCUs 30, 31 and 32 are restricted to predetermined particular ones which are common to all LCUs to facilitate implementation of the LCUs 30, 31, 32 in the form of a LSI (large scale integrated circuit). These particular functions are assumed to include the data transmission function mentioned above, i.e. the function required for the multiplexed transmission in the half duplex mode and the function of controlling the external device associated with the individual LCU such as an A/D conversion circuit 40 coupled with sensors. As a result, any data transmission function can be performed independently between any given one of the LCUs and the CCU without being subjected to mutual interference. Thus, the half duplex transmission can be advantageously adopted, for example, in an intra-car multiplexed wiring system, wherein the required transmission rate as well as the number of the address bits may be appropriately determined.

In the multiplexed transmission system under consideration, the functions of the LCU implemented in LSI can also be applied to the CCU 10. To this end, the CCU 10 may be constructed by combining a general purpose computer (e.g. microcomputer) having no data transmitting function with the LSI CIM 33 mentioned above. In that case, the software burden imposed on the computer of the CCU 10 can be reduced, while the general-purpose-nature of the transmission terminal can be enhanced. In this marner, implementation in LSI as well as exclusive or independent data communication between any given one of the LCLs and the CCU can be accomplished advantageously.

To realize the exchangeability or common usability of the LCUs 30, 31 and 32, inclusive of the CIM of the CCU, these LCUs 30, 31, 32 are all implemented in the same structure which will be referred to as the CIM (communication interface module) 33 capale of being combined with the microcomputer of the CCU. Accordingly, the LCU may also be referred to as a CIM in the following description. The CIM may be selectively set to any one of three modes, i.e. the DIO (data input-/output) mode, the A/D (analogue-to-digital conversion) mode and the MPU (micro-processing unit) mode through a mode setting operation performed externally. In the case of the illustrated embodiment, the DIO mode is required for the operation of the CIM in the LCUs 30 and 31 shown in FIG. 2. The A/D mode is required for the LCU or CIM 32 shown in FIG. 2. Finally, the MPU mode is required for the CIM 33 which is combined with the microcomputer to constitute the CCU 10.

FIG. 3A shows a general arrangement of the CIM which can be used for the various applications (such as LCU 30, 31, 32 and the CIM 33 shown in FIG. 2) according to an exemplary embodiment of the present invention. The transmission line 20 is coupled to a shift register 14 for loading the input data RXD therein. The output of the shift register 14 is connected to the transmission line 20 for outputting thereon the data TXD to be transmitted. It is taught by the present invention to realize the CIM so that it can selectively perform various functions by changing over the manner in which the received data RXD is fetched and the data to be transmitted is outputted. The shift register 14 is connected in parallel to input/output terminal pins $P_l$ to $P_n$ by way of plural interfaces 22, 24 and 26 (e.g. A/D, I/O and microcomputer interfaces) and a mode/IO (input/output) change-over circuit 28. The mode/IO change-over circuit 28 is controlled by a decoder matrix 12 for thereby controlling the connection of the individual input/output terminal pins $P_l$ to $P_n$ as well as the direction of the input and output. (In the case of the illustrated embodiment, three types of connections can be realized due to the three interfaces 22, 24 and 26.) The decoder matrix circuit 12 supplies plural sets of control signals in dependence on matrices which in turn are defined by two types of mode setting signals MSX and MSY. The control signals produced by the decoder matrix circuit 12 are also supplied to a control circuit 11 which is so designed as to produce control signals for realizing the various functions of the CIM at a predetermined timing, to thereby control the shift register 14, a fail-safe circuit 15, an interrupt circuit 17 and others. The fail-safe circuit 15 is activated by the control signal supplied from the decoder matrix circuit 12 to check the received data RXD by performing the predetermined fail-safe function. To this end, the output signal of the fail-safe circuit 15 is supplied to the control circuit 11. By way of example, when some abnormality is detected, the fail-safe circuit 15 supplies a command signal to the control circuit 11 to hold or reset (clear) the content in the shift register 14. An interrupt circuit 17 is connected in either one of bilateral directions to the microcomputer interface 26 under the control of the control circuit 11 for realizing the interrupt function.

In the case of the embodiment of the CIM illustrated in FIG. 3A, various functions can be realized through changing-over of the interfaces 22, 24, 26 and under the control of the control circuit 11. Besides, in the state in which one of the interfaces is selected, the operation speed can be varied by changing correspondingly the control timing signal produced by the control circuit 11. Further, by activating the fail-safe circuit 15, the fail-safe function described above can be selectively added. As will be appreciated, the phrase "matrix control" also means the controls of the various circuits from different stand-points of operation.

It should here be mentioned that at least one of the mode setting signals MSX and MSY may be additionally imparted with another function such as, for example, an address designating function. In this conjunction, when the address is imparted with a specific content or meaning (e.g. address "0" designates the CCU while "1" to "n" designate the LCUs, respectively), the address signal can serve at the same time to designate the desired function.

Figure 3B:
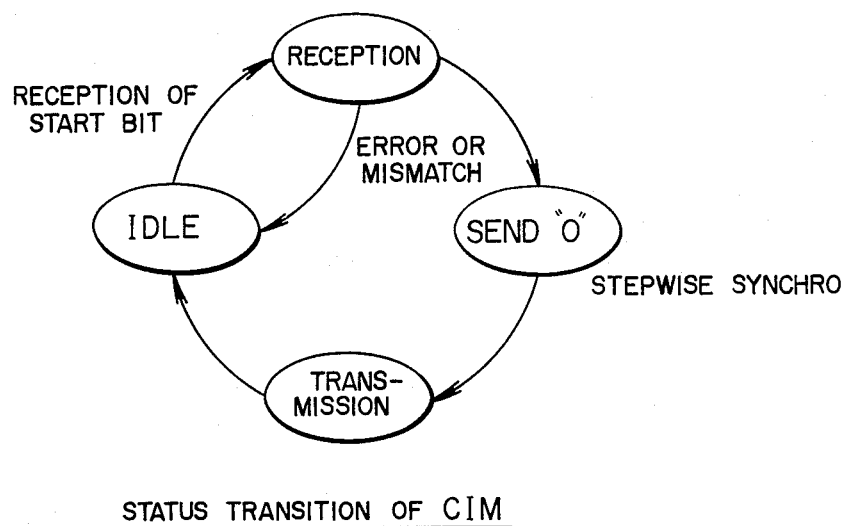

FIG. 3B illustrates schematically the operation cycle of the CIM shown in FIG. 3A. Upon detection of a start bit from the received data signal RXD from the transmission line 20, a status transition takes place from an idle status to the reception status. When it is found at the end of reception that the address attached to the received data RXD designates another CIM or when an error is detected in the received data, the idle status is regained. When the received data RXD is normal, data "0" is sent out at a step labelled "zero" for preparation of the stepwise synchronized transmission. Subsequently, at a step labelled "transmission", the data of the shift register 14 is transmitted. Upon completion of the transmission, the idle status is again restored.

Figure 3C:
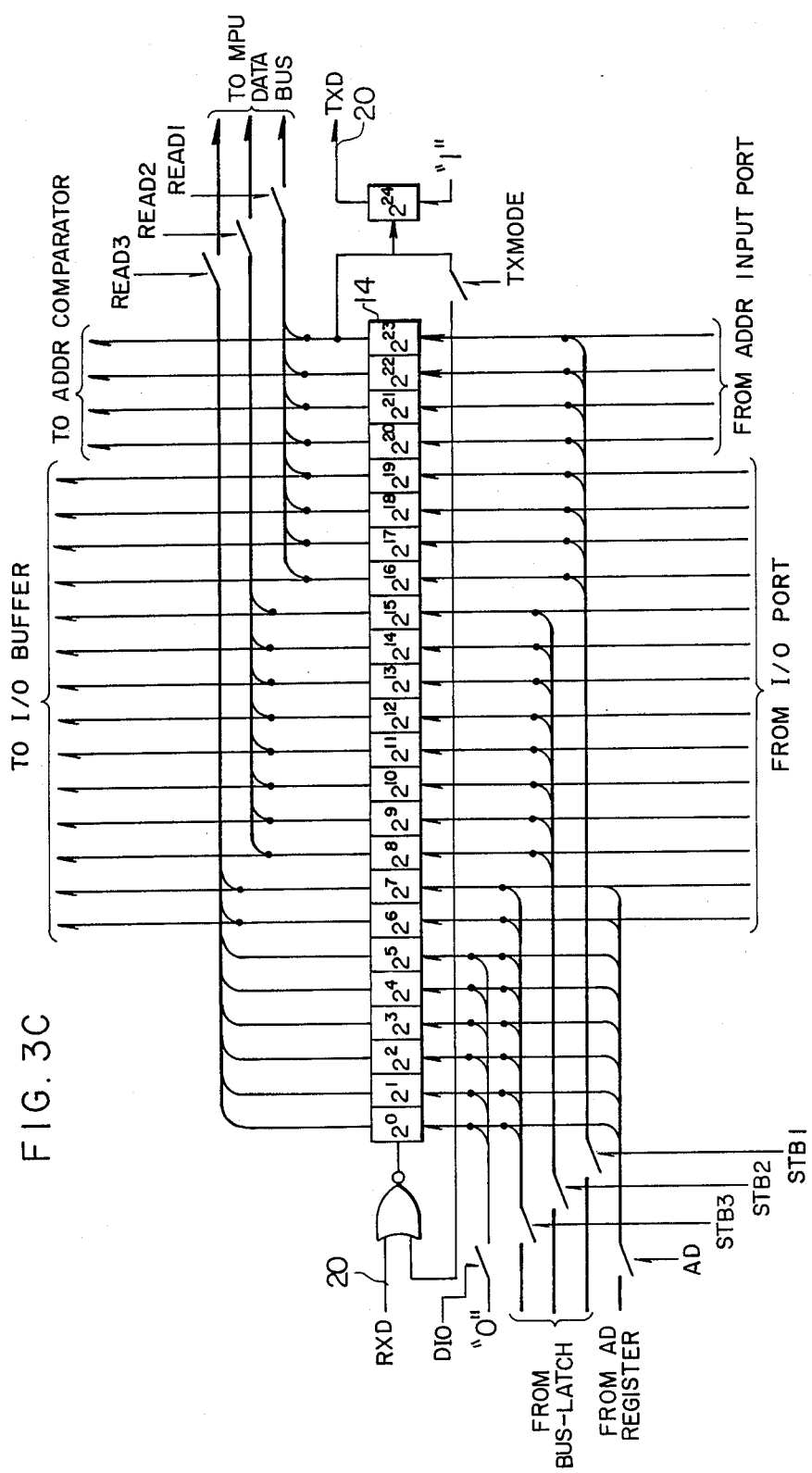

FIG. 3C shows an example of the wiring arrangement of the shift register 14 on the assumption that the register 14 has a 24-bit capacity. Although this register 14 receives the reception data RXD serially while sending out the transmission data TXD serially, parallel data inputting and outputting to and from the register 14 can be performed. The parallel input connections are shown at the lower side of the shift register 14, as viewed in FIG. 3C, while the parallel output connections are shown at the upper side of the shift register. The individual signal lines for the parallel input/output are provided with respective gates, whereby the connections of the signal lines are controlled by the mode of the interface.

In the MPU mode, the input gates each provided for eight bits are cyclically controlled by strobe signals STB 1, STB 2 and STB 3 to allow the MPU data to be inputted into the shift register 14 on an eight-bit basis. On the other hand, the output gates each provided for eight bits are cyclically controlled by read signals READ 1, READ 2 and READ 3, to allow the data stored in the shift register 14 to be sent out onto the data bus of the microprocessing unit or MPU.

In the DIO mode, 14 signal lines extending from the input/output port are connected, respectively, to the bit positions $2^6$, $2^7$, ..., $2^{19}$ of the shift register 14. The corresponding bits are connected to the input/output ports through an I/O buffer circuit. Further the shift register 14 receives at the four bit positions $2^{20}$, $2^{21}$, $2^{22}$ and $2^{23}$ the address signal from the four-port address input ADDR (i.e. MSX of FIG. 3A) and sends out the address signal to an address comparator, as will be described hereinafter. At the bit positions $2^0$ to $2^5$ which are not used, zeros "0s" are stored.

When the A/D conversion mode is selected by the mode selecting signal on the assumption that the A/D converter as used has an 8-bit output, the gate circuit is so controlled by the control signal that the 8-bit signal from the A/D converter is inputted in parallel to the shift register 14 at the bit positions $2^0, 2^1, \ldots, 2^7$. At that time, the input signal from the I/O port contains 12 bits. When the A/D data identifying signal is added, the number of the input signal bits from the I/O port is correspondingly reduced.

By the way, the connections shown in FIG. 3C at portions below and above the shift register 14 correspond to the connection shown in FIG. 3A above the shift register.

Figure 4:
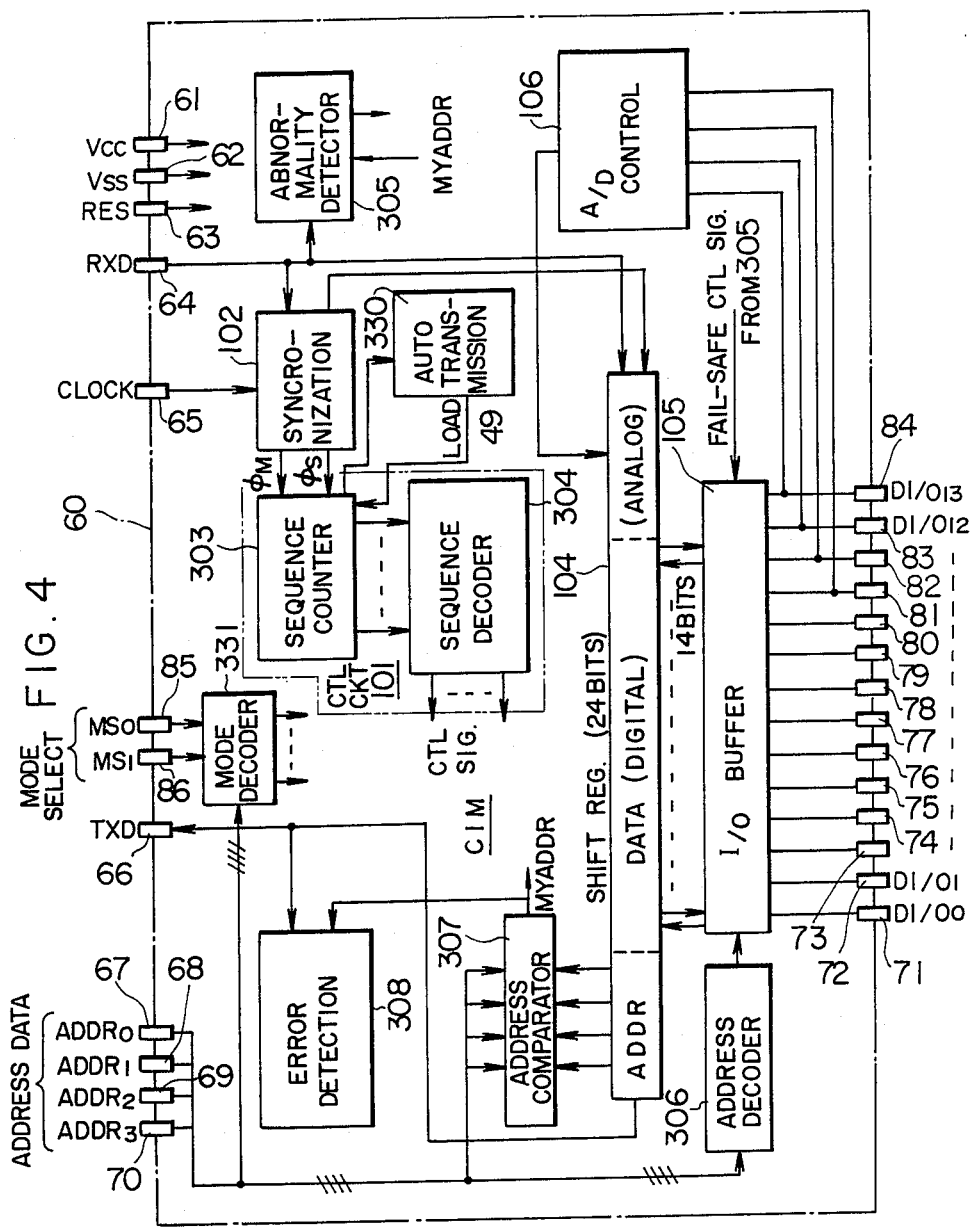
FIG. 4 is a block diagram showing a general arrangement of the CIM according to an embodiment of the invention.

An exemplary embodiment of the CIM implemented in the LSI form is illustrated in FIG. 4.

In this figure, numerals 61 to 86 denote terminal pins of the LSI package which is generally denoted by a numeral 60.

The terminal pins 61 and 62 are connected to a power supply source, while the terminal pin 63 serves as the input terminal for the reset signal.

The terminal pin 64 is coupled to the transmission line 20 (FIG. 2) and serves as the input terminal for the reception data signal RXD.

The terminal pin 65 serves for the clock input and is supplied with a clock signal of e.g. 4 MHz.

The terminal pin 66 is coupled to the transmission line 20 for sending out the transmission signal TXD.

The terminal pins 67 to 70 receive the address signal ADDR which is of four bits in the case of the illustrated embodiment. This address signal ADDR designates the destination of the data to which it is assigned. Additionally, the address signal ADDR is also made use of in the operation mode setting in the case of the illustrated embodiment.

The terminal pins 71 to 84 are used for connection of the external devices. These terminal pins 71 to 84 are used for transmission of the control signal for controlling the data input/output in dependence on the operation modes of the CIM.

The pins 85 and 86 serve as the input terminals for the mode select signals MS. The operation mode of the CIM is selected in dependence on the two types of signals $ADDR_0, \ldots, ADDR_3$ and $MS_0, \ldots, MS_1$.

In FIG. 4, a reference numeral 101 denotes a control circuit which includes a sequence counter 303 and a sequence decoder 304, etc., wherein various control signals are produced as the sequence counter 303 advances stepwise, to thereby control the operation of the CIM sequentially.

A synchronizing circuit 102 serves to create clock signals $\phi_M$ and $\phi_S$ in stepwise synchronism with the start bit of the reception signal RXD.

A shift register 104 of 24-bit capacity which corresponds to the register 14 shown in FIG. 3A is used for transmission and reception of serial data and for mutual conversion of serial and parallel data.

An input/output buffer 105 of 14-bit capacity serves to control the parallel data transfer between the external loads and the shift register 104.

An A/D control circuit 106 serves to control the equiped A/D converter 40 (FIG. 2).

An address decoder 306 serves to generate a predetermined signal in response to the address data ADDR applied to the terminal pins 67 to 70 while determining the input or output to or from the individual bits of the input/output (I/O) buffer 105. Additionally, the address decoder 306 produces signals for changing over the operation modes of the CIM, as will been described hereinafter.

An address comparison circuit 307 serves to compare the address set at the terminal pins 67 to 70 and the received data stored at the predetermined bit positions of the shift register 104 at a predetermined timing to thereby identify the address of the received data. An error detection circuit 308 serves to determine whether the received data suffers error involved in the course of transmission. When error is detected or when discrepancy is found between the set address and the received address, the CIM is reset by this error detection circuit 308.

An abnormality detector circuit 305 serves to monitor the reception signal RXD inputted through the terminal pin 64. When the reception signal RXD is interrupted for a duration which is longer than a predetermined period, the abnormality detector circuit 305 determines that abnormality takes place and produces a fail-safe control signal which is then supplied to the I/O buffer 105 to fix the associated output port in a predetermined state.

An automatic transmission circuit 330 checks the count contained in the sequence counter 303. When the count has attained a predetermined count value, a predetermined number is added to the count output of the sequence counter 303 so that the control state of the sequence decoder 304 attains the state required at a time point $t_x$ shown in FIG. 9.

The automatic transmission circuit 330 causes the sequence counter 303 to make a jump under a predetermined condition to thereby realize the automatic transmission function.

A mode decoder 331 is connected to the terminal pins 67–70, 85–86 and serves to create the operation mode change-over signal for controlling the interconnections and operation of the individual components in accordance with the matrix determined by the two types of input signals $ADDR_0, \ldots, ADDR_3$ and $MS_0, MS_1$.

The address signal and the mode setting signal are inherently of different natures. However, by taking advantage of the fact that the functions (i.e. operation modes) of the individual CIMs are practically determined in accordance with the locations (i.e. addresses) of the CIMs, the address signal is utilized additionally as the operation mode setting signal in the case of the illustrated embodiment. More particularly, the CIM disposed at the central control unit or CCU and the CIMs which constitute, respectively, the local control units or LCUs are assigned mutually different addresses which are imparted with the contents or meanings indicating the functions to be performed by these different CIMs. In this connection, it should be mentioned that when the operation mode is designated only by the address, the CIM can not perform more than the single kind of operation designated by the address. To avoid such undesirable situation, the mode selecting signals MS are used to allow two or more different functions to be selectively realized.

In the first place, the address setting through the terminal pins 67, 68, 69 and 70 will be elucidated.

As described hereinbefore, the individual CIMs are assigned respective addresses (address signals ADDR) which differ from one another, and the data transmission of the half duplex mode is performed on the basis of these addresses.

The input means for the address signal to the associated CIM is constituted by the four terminal pins 67, 68, 69 and 70 which are connected to the address comparator 307, wherein the data $ADDR_0, \ldots, ADDR_3$ applied to these input terminals 67 to 70, respectively, designates the decimal address of the CIM in concern. For example, it is assumed that a given one of the CIMs is designated by the address "10", and that the corresponding binary address data is $ADDR_0 = $ "0", $ADDR_1 = $ "1", $ADDR_2 = $ "0" and $ADDR_3 = $ "1". On this assumption, the given CIM can be designated by applying a binary number "1010" to the terminal pins 67 to 70. When the data value "0" is to be represented by the ground potential while the data value "1" is represented by a source voltage $V_{cc}$, the address "10" can be produced by connecting the terminal pins 67 and 69 to ground potential with the terminal pins 69 and 70 being connected to the source voltage $V_{cc}$.

The address data ADDR is also supplied to the address decoder 306 for controlling the input/output port of the I/O buffer 105. More specifically, when an address is designated, those of the 14 terminal pins of the I/O buffer 105 which constitute the output port are determined. For example, the address itself may indicate the number of the output port constituting pins. More specifically, in response to the address "10", ten of fourteen terminal pins may be used for the output port with the four remaining terminal pins serving as the input port.

The address data ADDR is additionally supplied to the mode decoder 331 together with the mode select signals MS to control the operation of the CIM.

Figure 5A:
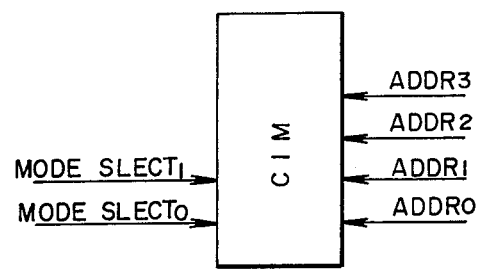

There are shown in FIG. 5A four input terminals (the pins 67, 68, 69 and 70 shown in FIG. 4) for the address data ADDR and two terminal pins (85 and 86 in FIG. 4) for receiving the mode select signals MS. According to the teaching of the invention as provided in the illustrated embodiment, the operation mode is set in accordance with the matrix (combination) of the address input and the mode select input.

FIG. 5B shows a matrix chart for illustrating an example of the operation mode selections based on combinations of the address data ADDR and the mode select signal MS. From this matrix chart, it will be apparent in what manner the operation modes are selectively established on the basis of combinations of addresses "0" to "F" designated by the four-bit address signals and the two-bit mode select signals $MS_0$, $MS_1$.

In each of the matrix components, there are mentioned a set of three different items except for test modes $TEST_1$-$TEST_3$. The first or top item represents the transmission mode. More specifically, "MPU CNTL", an abbreviation of the MPU-controlled mode, represents the transmission mode initiated in response to the command issued by the MPU, the label "ACTIVE" represents the active transmission mode which is cyclically started automatically, and "PASSIVE" represents the passive mode in which the CIM effects no transmission but performs only the reception. The second or intermediate items represent input/output connections. The label or expression "BUS-COMPATIBLE" represents the mode in which the direct connection to a bus of the micro-computer is permitted, "ADDR CNTLD IO" represents the mode in which the input/output configuration is determined by the address signal ADDR, "FLXED IO" represents the mode in which the input/output configuration is fixed, "AL IN" represents the mode in which the input/output ports are set as the input-only ports, and "AL OUT" represents the mode in which the whole input/outprt ports are set as the output-only ports. The bottom items concerns the presence or absence of the fail-safe function. More specifically, "F/S ENABLED" represents the mode in which the fail-safe function is enabled or validated, and "F/S DISABLED" represents the mode in which the fail-safe function is invalidated or disabled. Except for the columns corresponding to the address of "F", the fail-safe function is disabled when the mode select signal $MS_0$ is "0" and enabled when $MS_0$="1". On the other hand, in case ADDR="F", the fail-safe function is enabled when the exclusive OR of $MS_0$ and $MS_1$ is "1", while the former is disabled when latter is "0".

The input/output interface is determined by the address signal. In the chart shown in FIG. 5B, the symbol MPU represents the interface for connection with the microcomputer, DIO represents the interface for the data input/output to and from the LCU (local control unit), and AD represents the interface for the externally equiped A/D converter. It is self-explanatory that the modes mentioned above may be increased and changed or modified in dependence on the intended applications of the CIM.

The format of data for transmission and reception is determined in dependence on the selection of the interface modes. FIG. 5C illustrates, by way of example, formats of 24-bit data plus the start bit for the interface modes MPU, DIO and AD. The MPU interface mode is intended only for the communication with the microcomputer. Accordingly, no address data is required. The data format for this purpose is therefore constituted by 25 bits including one start bit and three MPU data bytes each of 8 bits. The data format for the DIO mode is constituted by 25 bits including DIO data of 14 bits corresponding to 14 input/output terminal pins, the address data of 4 bits, six unused bits and the one start bit. The data format for the AD mode includes 8 bits of AD data supplied from the A/D converter 40, two bit for channel designation for the AD data, 10 bits of the DIO data, 4 bits of the address data and one start bit. By the way, the individual bits for the DIO mode are utilized for the switch control and other purposes, as shown in FIGS. 1 and 2.

INTERFACE MODES

Description will be made of DIO, AD and MPU interface modes.

First, the address is set to any one of "1" to "D" (shown in FIG. 5C). Then the interface is set to the DIO mode. The functional state of the CIM in the DIO mode is schematically illustrated in a block diagram of FIG. 6.

Referring to FIG. 6, the received data signal RXD inputted through the transmission line 20 is supplied to the synchronizing circuit 102, while the control circuit 101 is supplied with the clock signals $\phi_M$ and $\phi_S$ synchronized stepwise with the clock components contained in the received data signal RXD, resulting in the control circuit 101 producing a control signal which allows the shift register 104 to read serially the received data signal.

On the other hand, the address comparator circuit 307 is supplied with the address signal ADDR designating one of the addresses "1" to "D" which is previously assigned to the CIM under consideration. This address is compared through the address comparator 307 with the address contained in the received data RXD placed in the shift register 104 at the predetermined bit positions. Only when both addresses coincide with each other will the data contained in the shift register 104 be transferred to the I/O buffer 105 to be subsequently supplied to external equipment.

The control circuit 101 includes a counter which advances step by step in response to the clock signal (see FIG. 4) for producing a sequential control signal which causes the shift register 104 to fetch the data in parallel from the I/O buffer 105 in succession to the data transfer of the received signal RXD to the I/O buffer 105, whereby the data to be transmitted to the CCU (central control unit) 10 from the external equipment or device is provided by the shift register 104 in the form of serial data, which data is then serially read out from the shift register 104 to be sent out on the transmission path 20 as the transmission data signal TXD. At that time, the address attached to the received data signal RXD mentioned above is attached intact to the data TXD to be transmitted. As a consequence, there arises no possibility that the transmission signal TXD might be received by other CIMs or LCUs coupled to the transmission path 20. On the other hand, the central control unit or CCU 10 identifies the address of the signal TXD as the one which has been attached to the signal RXD by the CCU itself and thus fetches the transmission signal TXD. In this way, one cycle of the data exchange or transaction (i.e. transmission and reception of data) based on the half duplex transmission comes to an end.

The CCU 10 is then capable of transmitting data to a next one of the LCUs or CIMs. The data exchange is repeated in this manner. In other words, the data transactions are periodically performed between the CCU 10 and a plurality of the LCUs 30, 31, 32 on a multiplexed transmission basis.

The data content or format of the shift register 104 in the DIO interface mode is illustrated in FIG. 5C at the column labelled "DIO MODE". As will be seen, the six bits No. 0 to No. 5 are not used, 14 bits identified by No. 6 to No. 19 are assigned to the data for the I/O buffer 105. The four bits No. 20 to No. 23 are assigned to the address data ADDR. The last bit No. 24 is used as the start bit. Under these conditions, the number of the external devices or loads which can be connected to the I/O buffer 105 of the CIM under consideration is limited to 14 at maximum which corresponds to the number of the terminal pins 71 to 84 shown in FIG. 4.

The data transmission system may be referred to as a stepwise synchronized half-duplex complementary repeat check type data transmission system which is operative on the NRZ (non-return to zero) basis.

The data frame of this transmission system is such as shown in FIG. 7. Referring to the figure, a frame for transmitting the data from the CCU CIM to the LCU CIM is called a receiving frame, and a frame for transmitting the data from the LCU CIM to the CCU CIM is called a transmitting frame. Each of the receiving frame and the transmitting frame have 74 bits and hence one frame is composed of 148 bits. The receiving frame and the transmitting frame have the same frame configuration, in which first 25 bits are "0", being followed by one bit of "1" for the start bit for the stepwise synchronization, which is then followed by 24 bits constituting the received data RXD or transmission data TXD in the NRZ form, being finally followed by the inverted received or transmission data $\overline{RXD}$ or $\overline{TXD}$. The inverted data $\overline{RXD}$ or $\overline{TXD}$ is transmitted for a purpose of effecting the transmission error check by means of the error detector 308.

The address data ADDR of the LCU called by the CCU is contained at the first four bits of the receiving frame data RXD, as illustrated in FIG. 5C and the same address data ADDR is placed at the first four bits of the transmitting frame data TXD sent from the LCU. Since only the LCU that is called by the CCU can send the transmission frame, the CCU can immediately determine the origin LCU of the incoming data even if the address data has not been attached to the transmission data TXD. Accordingly, the transmitting frame data TXD need not necessarily contain the address. In case two or more CCUs are provided and transmission takes place between the CCUs, the first four bits of the data TXD may contain data such as "0000" which does not coincide with the addresses of any LCUs.

Figure 8:
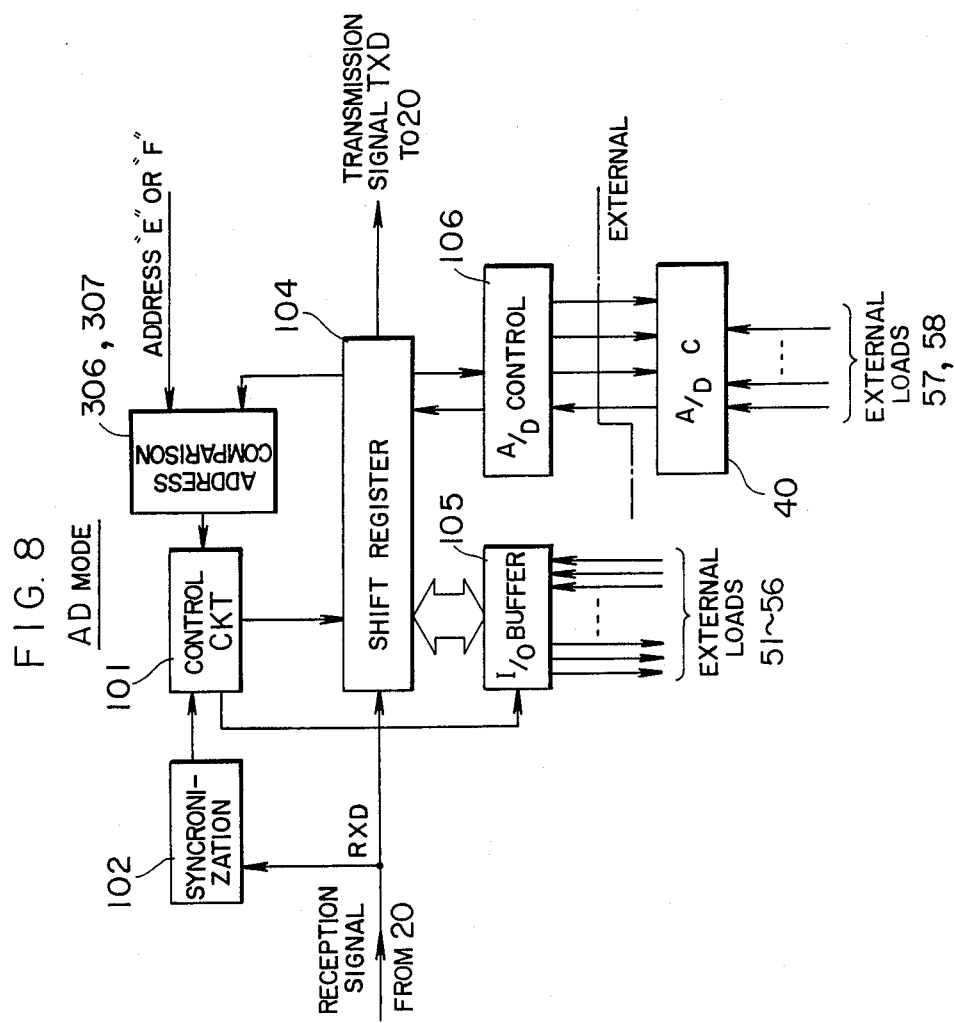
FIG. 8 is a functional block diagram for illustrating A/D (analogue-to-digital conversion) functional mode.

Next, the AD interface mode will be described. When the address is set to either "E" or "F" (see FIG. 5B), the interface for the CIM is set to the AD mode. FIG. 8 shows in a block diagram the functional state or configuration of the CIM in the AD mode.

The A/D control circuit 106 shown in FIG. 4 performs the required control function of the A/D converter 40 shown in FIG. 2, in case the CIM in concern is used as the local control terminal or LCU 32 (FIG. 2). In this AD mode, analog data derived from the external loads 57 and 58 such as sensors or the like are converted into digital data which is then loaded in the shift register 104 under the control of the A/D control circuit 106.

The contents of the data stored in the shift register 104 of the CIM set to the AD mode are prepared in the format shown in FIG. 5C at the column labelled "AD MODE". More specifically, eight bits identified by No. 1 to No. 7, respectively, are used for storing the digital data derived from the external loads 57, 58 or the like through the A/D converter 40 (FIG. 2), two bits Nos. 8 and 9 are used for storing the AD channel designating data, ten bits identified by No. 10 to No. 19, respectively are used for storing DIO data. The other bits serve for the same purpose as in the DIO mode. The AD channel data mentioned above serves for designating a data channel in the AD mode when a multi-channel A/D conversion is adopted. The number of channels of the A/D converter 40 may be up to four, since the channel designation is allotted with two bits, as mentioned above.

The A/D control circuit 106 incorporates therein a sequence counter and a sequence decoder for its own use and can operate independent of the control operation performed by the control circuit 101. The control operation of the A/D control circuit 106 advances under the timing control of the clock signal to perform the control sequentially. More specifically, the A/D control circuit 106 controls the externally equiped A/D converter 40 in such a manner that analog data produced by a maximum of four different types of external devices are sequentially and periodically converted into digital signals which are serially and sequentially written in a four-channel register array incorporated in the A/D control circuit 106.

The reception frame (i.e. format of data written in the shift register 104) is shown in FIG. 5C at the column labelled "AD MODE", as mentioned earlier. There are stored in the shift register 104 at the bit positions $2^8$ and $2^9$ (refer to FIG. 3C) the AD channel data ADCH of two bits which serves to designate that register of the channel from which the AD data is to be read out.

On the basis of the AD channel data, the A/D control circuit 106 reads out one of the AD data stored in the four-channel register array to thereby place the AD data in the shift register 104 at the eight bit positions $2^0$ to $2^7$ (refer to FIG. 3C).

Upon sending out the transmission frame, the transmission signal TXD containing the AD data is transmitted to the CCU. The DIO data at the bit positions $2^{10}$–$2^{19}$ are handled in the same manner as in the case of the DIO mode described hereinbefore.

It should be recalled that in the CIM under consideration, the AD data is constantly provided in the register incorporated in the A/D control circuit 106 independent of the processing of the received signal RXD and the subsequent processing of the transmission signal TXD.

For this reason, the CIM can perform instantly the transmission of the signal TXD containing the AD data regardless of the timing at which the signal RXD destined for that CIM makes an appearance. The processing for the transmission of the signal TXD undergoes no influence of the operation of the A/D converter 40. In other words, there arises no possibility that the transmission rate or speed might be reduced due to the time required for the operation of A/D conversion.

In the system being described, the A/D converter 40 is provided as the externally attached device so that the general purpose nature or general usability of the CIM implemented in the LSI form can be enhanced while the manufacturing costs can be decreased. In other words, the CIM of one and the same structure can be used as the LCU 30 and 31 or LCU 33 or the CIM 33 for the CCU 10 (see FIG. 2) by simply changing over the operation modes. It will be seen that an A/D converter (40, FIG. 2) incorporated in a CIM will be wasteful when that CIM is used as the LCU 30 or 31 or the CIM 33 for the CCU. In general, the number of CIM chips used as the CIM 32 is smaller than the number of CIMs 30, 31 and 33 when the system is employed in a multiplexed wiring system for an automobile or the like. Accordingly, it is undesirable to include the A/D converter 40 in all CIMs. For this reason, the A/D converter is provided as an externally attached component or a so-called off-chip component.

Because of the external attachment of the A/D converter 40, four connecting terminals are required to this end, involving an increased number of pins of the LSI CIM.

In the illustrated embodiment of the present invention, four of fourteen ports of the I/O buffer 105 are selected as the connecting terminals to the A/D converter 40 in the circuit configuration shown in FIG. 4, when the CIM is to be set in the AD mode. In other words, the I/O buffer 105 has fourteen ports all of which may be used as input/output ports when the CIM is set in the DIO mode. However, in the AD mode, ten ports at maximum are used with the four ports remaining unused as the DIO data input/output ports. Accordingly, these four remaining ports can be used as terminal pins for connecting the A/D converter 40 which is implemented as an externally attached component (off-chip component). Thus, the number of pins is not increased by the external A/D converter (off-chip converter) and the cost of the LSI is also prevented from increasing, while an enhanced general usability can be assured.

The operation of the interface in the MPU mode will now be described. In order to set the CIM to the MPU mode, the addresses $ADDR_0$–$ADDR_3$ of this CIM are set to "0".

In the MPU mode, the functions necessary to the CIM 33 of FIG. 2 are realized. Unlike the DIO mode and the AD mode, the MPU mode effects the transmission interface in which when data is supplied from the microcomputer of the CCU 10, the data is transmitted onto the transmission line 20 in a serial form. When data transmitted back in response thereto is received, the received data is transferred to the microcomputer in a parallel form.

By the way, the frame used for the transmission of data to the CIM of the local control unit LCU) from the CIM of the CCU is referred to as the reception frame for the LCU CIM, while the same frame is referred to as the transmission frame for the CCU CIM. Accordingly, the transmission frame shown in FIG. 9 for the CCU corresponds to the reception frame shown in FIG. 7 for the LCU.

Figure 10:
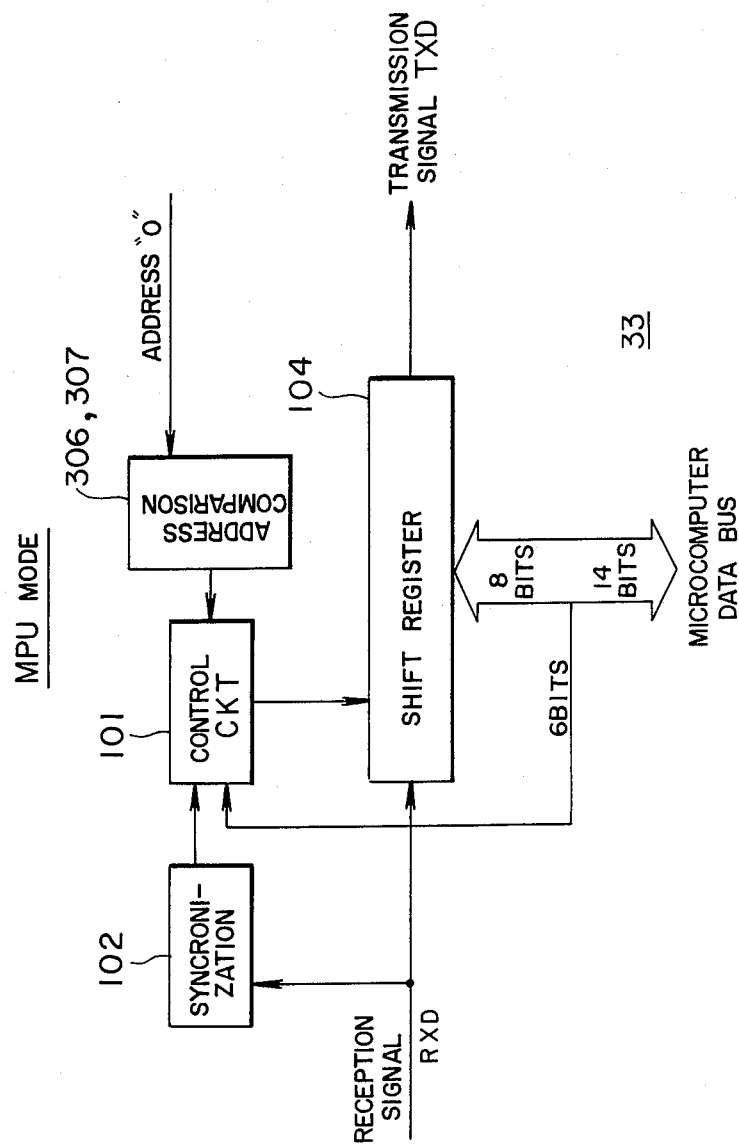
FIG. 10 is a functional block diagram for illustrating a MPU (microprocessing unit) mode.

FIG. 10 shows in a schematic block diagram the functional state in the MPU mode established when the address "0" is set to the CIM of the CCU. As will be seen in FIG. 10, the functions of the I/O buffer 105 and the AD control circuit 106 are suppressed and the CIM is connected to the microcomputer through the 14-bit data bus in the MPU mode. In this mode, the terminal pins are shared with the input/output ports of the I/O buffer 105 so that no change occurs in the number of terminal pins.

Eight (8 bits) of fourteen input/output ports are used for the data and the remaining six ports (6 bits) are used for the control signal.

In the CPU mode, the data content of the shift register 104, that is, all the data at 24 bit positions constitute the MPU data, as shown in FIG. 5C at the column labelled "MPU MODE". The microcomputer can make access to the shift register 104 through the 8-bit data bus. For the data transfer between the microcomputer and the shift register 104, three bytes are required for accessing in one cycle.

Figure 9:
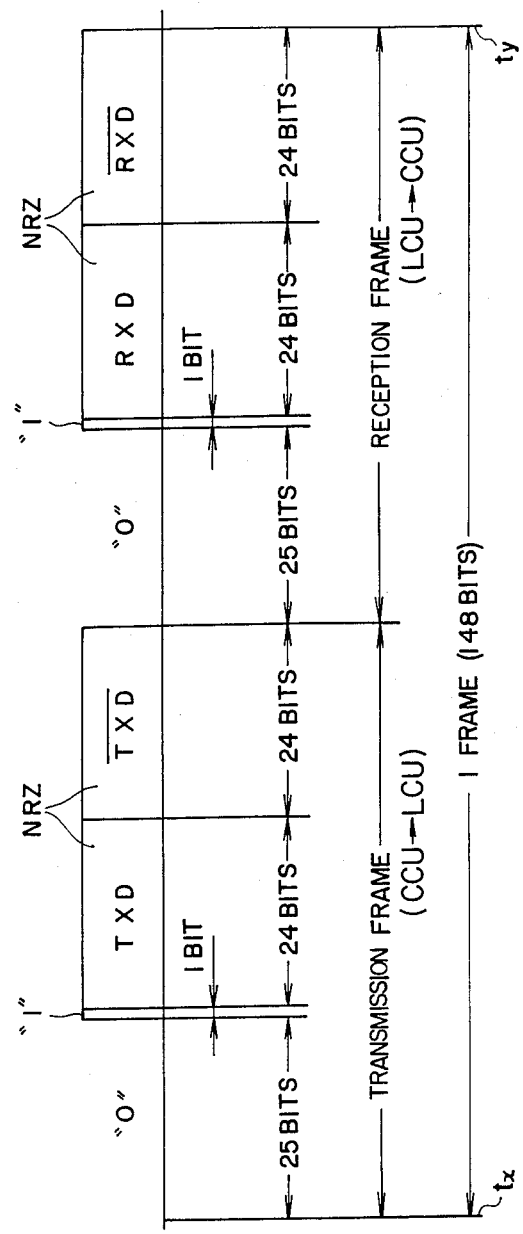
FIG. 9 is a view showing another example of transmission waveform.

The control circuit 101 receives a control signal from the microcomputer and starts the transmission of the transmission frame shown in FIG. 9 from a time point $t_x$ when the data from the microcomputer has been stored at all bit positions $2^0$–$2^{23}$ (FIG. 3C) of the shift register 104.

As the transmitting frame is transmitted from the CIM 33 of the CCU, one of the CIMs 30, 31 and 32 serving as the LCU receives the data frame and subsequently transmits a response to the CCU. At a time point $t_y$ when the time required for the transmission of one frame (148 bits) has elapsed, the data transmitted from the CIM (one of the CIMs 30–32) called by the CIM 33 has been stored in the shift register 104.

The control circuit 101 of the CIM 33 generates an interrupt request IRQ at the time point $t_y$. The microcomputer responds thereto to read the data from the shift register 104. Thus, one cycle of the data transmission comes to an end.

OPERATION MODE (Test Mode)

When the address data is set to "0" with the mode select input being set to other than "0, 0", there is established a test mode in which a test of the CIM manufactured in the form of a LSI can be readily carried out. In test mode "TEST1" or "TEST2" (refer to FIG. 5B), the counting operation of the sequence counter 303 (FIG. 4) is effected at a higher speed than the normal count operation speed (e.g. at four times as high a speed as the normal speed), whereby the test as to whether the functions involved in the data reception and transmission in the DIO and AD modes are normal or not can be conducted speedily within a short time.

In the test mode referred to as "TEST2", the abnormality detecting circuit 305 can be put to operation without any substantial waiting time, whereby the circuit 305 can be checked as to whether the function thereof is normal or not.

(I/O Configuration)

In the DIO mode, the input/output direction of the I/O port is also determined by the address data. In the MPU mode established by the address "0" and the mode select bits of "0, 0", the I/O port is bilateral or duplex, wherein the input and output of data are controlled by the microcomputer to which the CIM is connected.

On the other hand, when the address is "0" while the mode select bits MS are other than "0, 0", which means the test mode mentioned above, and when the address is set to "E" or "F", i.e. in the AD mode, the input/output direction of the I/O port is determined by the mode select bits $MS_0$ and $MS_1$.

(Fail-Safe)

With the fail-safe function, it is contemplated to activate the abnormality detector circuit 305, wherein the output status of the I/O buffer 105 is fixed when the abnormality is detected. Upon detection of the abnormality, it is possible to fix the output data issued from the input/output terminals to the output mode in the status existing immediately before the abnormality is detected (this is referred to as the current status maintenance mode), or alternatively break the data transmission of all the terminals in concern (as referred to as the OFF mode).

In the transmission system in which the CIMs are employed, a large number of signals are transmitted by way of a single optical fiber cable. Under the circumstance, failure of transmission due to breakage of the transmission line, for example, will exert very adverse influence on the status of many electric/electronic devices or equipments being controlled, giving rise to a serious problem with respect to the operation of the automobile.

Accordingly, in the transmission system under consideration, it is desirable that any abnormality such as failure occurring in the transmission line is detected without fail, to thereby assure the safety for the operation of the apparatus, such as an automobile in which the transmission system is employed, by holding the operations of the loads such as electric devices in the state which is unlikely to involve a safety problem even when the control of the loads is interrupted.

To deal with the situation mentioned above, there is provided the abnormality detecting circuit 305 and the fail-safe function, details of which will be described below.

Figure 11:
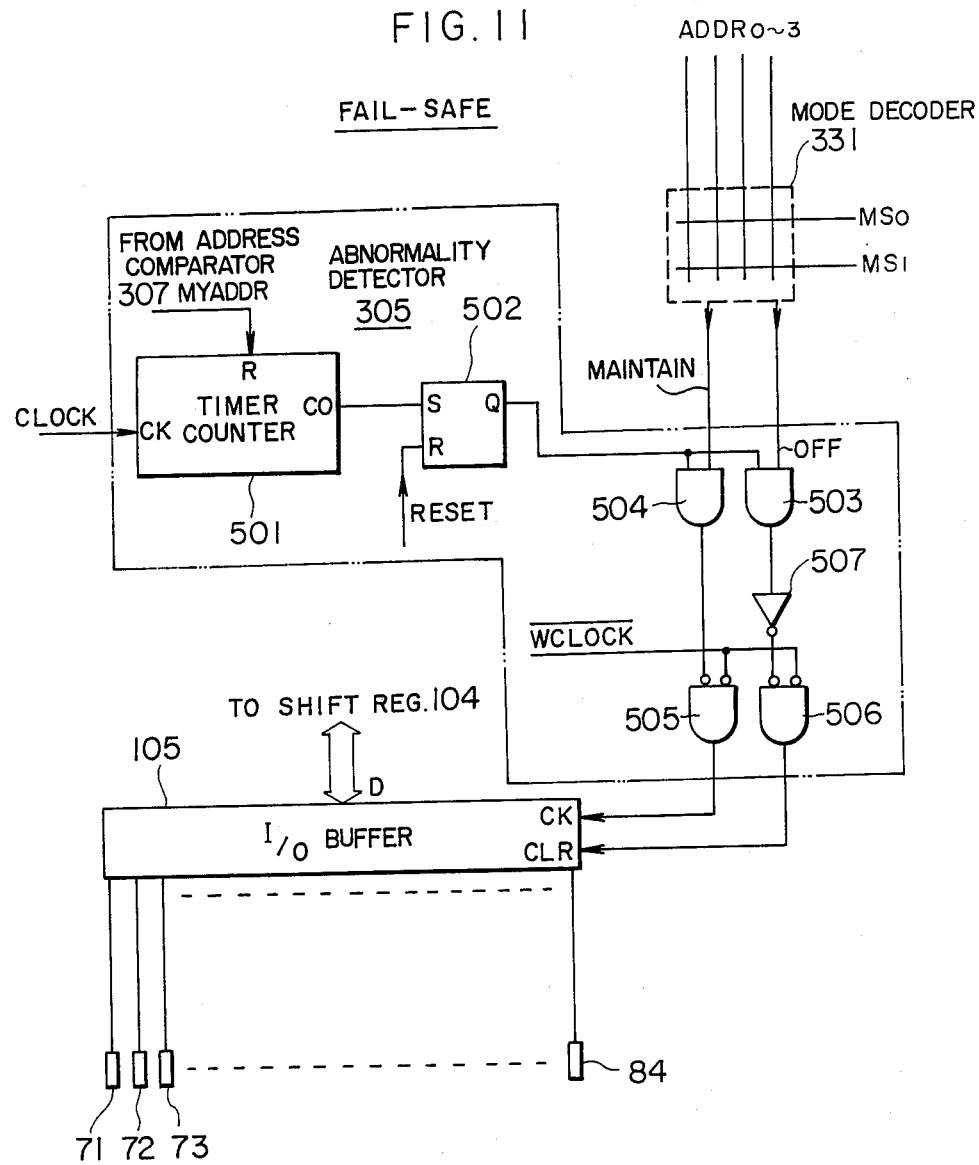
FIG. 11 is a block diagram showing an exemplary circuit arrangement of an abnormality detection and fail-safe circuit.

FIG. 11 shows an exemplary circuit arrangement of the abnormality detecting circuit 305. In the figure, a reference numeral 501 denotes a counter serving as a timer, 502 denotes a flip-flop serving as a one-bit register, 503 to 506 denote AND gates, 507 denotes an inverter, and 331 denotes a mode decoder.

The counter 501 counts clock pulses at an appropriate rate. When the number of the counts attains a predetermined value, the counter 501 produces a carry-out output signal CO. The counter 501 has a reset input R to which is applied an address coincidence signal MYADDR produced by the address comparison circuit 307 (shown in FIG. 4).

The mode decoder 331 serves to generate change-over signals in dependence on the combinations of the address and mode select bits illustrated in FIG. 5B. In connection with the fail-safe function, the mode decoder 331 activates the fail-safe function and produces the OFF mode signal or the current status maintenance mode signal. The OFF mode signal is applied to one input of the AND gate 503, while the current status maintenance mode signal is applied to one input of the AND gate 504.

On the other hand, the I/O buffer 105 is so arranged that the loading of data in the buffer requires application of a write clock signal to the clock input terminal CK. In other words, data D supplied from the shift register 104 (FIG. 4) to be written in the I/O buffer 105 at the predetermined bit positions cannot straightforwardly be loaded in the buffer 105. The loading of the data D in the I/O buffer 105 can be accomplished only when a clock signal is applied to the clock input CI of the I/O buffer 105, whereby the content in the buffer 105 is rewritten. On the other hand, when a clock signal is applied to a clear input CLR of the I/O buffer 105, data D contained therein is all cleared, resulting in the data appearing on the output ports of the buffer 105 being all zero "0". As the consequence, all the loads such as electric devices or equipments connected to these ports are turned off.

The counter 501 which constantly performs the counting operation in response to the clock is reset only when the signal MYADDR is inputted from the address comparator 307.

Accordingly, so long as the signal MYADDR does not make an appearance at the reset input R of the counter 501, the carry-out output signal CO is periodically produced at an interval which is determined by the clock frequency and the bit capacity of the counter 501.

As described above, the signal MYADDR is the output of the address comparison circuit 307. This signal MYADDR is produced when the CIM (communication interface module) incorporating this address comparator 307 receives the data destined for the CIM itself, provided that the CIM is in the DIO mode, AD mode or in the automatic transmission mode as described hereinabove. In this connection, it should be recalled that in the data transmission system in which the CIMs are employed, any of the CIMs will receive the data accompanying its own destination address without fail within a predetermined period so long as the transmission system operates normally.

It is now assumed that the periodic interval (designated by PCO) at which the carry-out output CO is produced by the counter 501 is longer by a predetermined value than the maximum periodic interval (designated by PD) at which the associated CIM receives the data destined for the CIM itself, by selecting appropriately the clock frequency inputted to the counter 501 and the bit capacity thereof. In other words, the condition that PCO>PD applies valid.

On the conditions, so long as the functions of the transmission system including the CIMs as the LCUs 30, 31, 32 as the well as CIM of CCU 10 and the transmission path 10 are performed normally, data transmission to any CIM necessarily takes place within the period PD mentioned above, whereby the signal MYRADDR is also produced by the address comparator 307 within the period PD. As a result, the counter 501 is necessarily reset before the count thereof reaches the value at which the carry-out signal CO is output, because of the above mentioned condition that PCO>PD. Thus, so far as the transmission system inclusive of the CIMs is in the normal operating state, the carry-out signal CO is inhibited from being produced, which in turn means that the flip-flop 502 also remains in the reset state.

Next, it is assumed that an abnormality of some kind such as e.g. breakage of the transmission path 20 to a given one of the CIMs does occur. On this assumption, the given CIM can no longer receive the data destined for it after the occurrence of the abnormality, with the result that the signal MYADDR is no longer produced by the address comparator of the given CIM. Consequently, the counter 501 of the given CIM will continue to count the clock signal without being reset after it was once reset at the time point the data was received by the given CIM immediately before the abnormality has occurred. Accordingly, the counter 501 produces the carry-out signal CO at the latest when the time corresponding to the period PCO mentioned above has elapsed from the time point at which the abnormality occurred. In response to the carry-out signal CO, the flip-flop 502 is set, needless to say.

As will be understood from the above, the counter 501 does not produce the carry-out output signal CO so long as the transmission system suffers no abnormality with the normal data transfer being carried out, whereby the flip-flop 502 is maintained in the reset state. However, when an abnormality occurs due to some cause in the transmission system to inhibit the data reception ty a given CIM, the counter 501 belonging to that given CIM produces the carry-out output CO to thereby set the flip-flop 502. Thus, the occurrence of the abnormality can be detected on the basis of the state of the flip-flop 502. In this manner, the abnormality detecting function is realized.

The flip-flop 502 has a Q-output terminal which is connected to one input of the AND gates 503 and 504, respectively. Accordingly, when the flip-flop 502 is set in response to the occurrence of an abnormality, as described above, both the AND gates 503 and 504 are enabled.

The AND gates 503 and 504 have other inputs, respectively, to which the current status maintenance mode signal and the OFF mode signal are applied, respectively, from the mode decoder 331. These mode signals are selectively produced by the decoder 331 in dependence on predetermined combinations (matrices) of the address signal ADDR and the mode selecting bits MS. It will be seen in FIG. 11 that these two mode signals are not simultaneously supplied to the respective AND gates. In other words, the following relation applies to these mode signals;

CURRENT STATUS MEINTENANCE MODE ⊕ OFF MODE=1,

Assuming now that the fail-safe function is selected to the current status maintaining mode by the mode decoder 331, only the output of the AND gate 504 becomes "1" when the Q-output of the flip-flop 502 is set to "1" in response to the detection of an abnormality. As a consequence, the output of the AND gate 505 is fixed to "0", resulting in the write-in clock derived from a clock signal $\overline{WCLOCK}$ being inhibited from being supplied to the I/O buffer 105 at the clock input terminal CK thereof. In this manner, in the current status maintenance mode, the data write-in (or rewriting) operation to the I/O buffer 105 remains inhibited after an abnormality was detected, whereby the output data status of the I/O buffer 105 is held in the state existing immediately before the abnormality was detected. Thus, the fail-safe function can be realized in the current status maintaining mode.

Next, it is assumed that the OFF mode is selected for the fail-safe function by the mode selector 331. On this assumption, when an abnormality is detected, only the output of the AND gate 503 assumes logic "1", as the result of which the AND gate 506 is enabled through the inverter 507, whereby a pulse signal derived from the clock $\overline{WCLOCK}$ is applied to the clear input terminal CLR of the I/O buffer 105. Accordingly, all the data in the I/O buffer is cleared, immediately after the abnormality detection, resulting in the output data of the I/O buffer 105 being all zero. This means that all the loads connected to the output of the buffer 105 are turned off. In this way, the fail-safe function is realized in the OFF mode.

Figure 12:
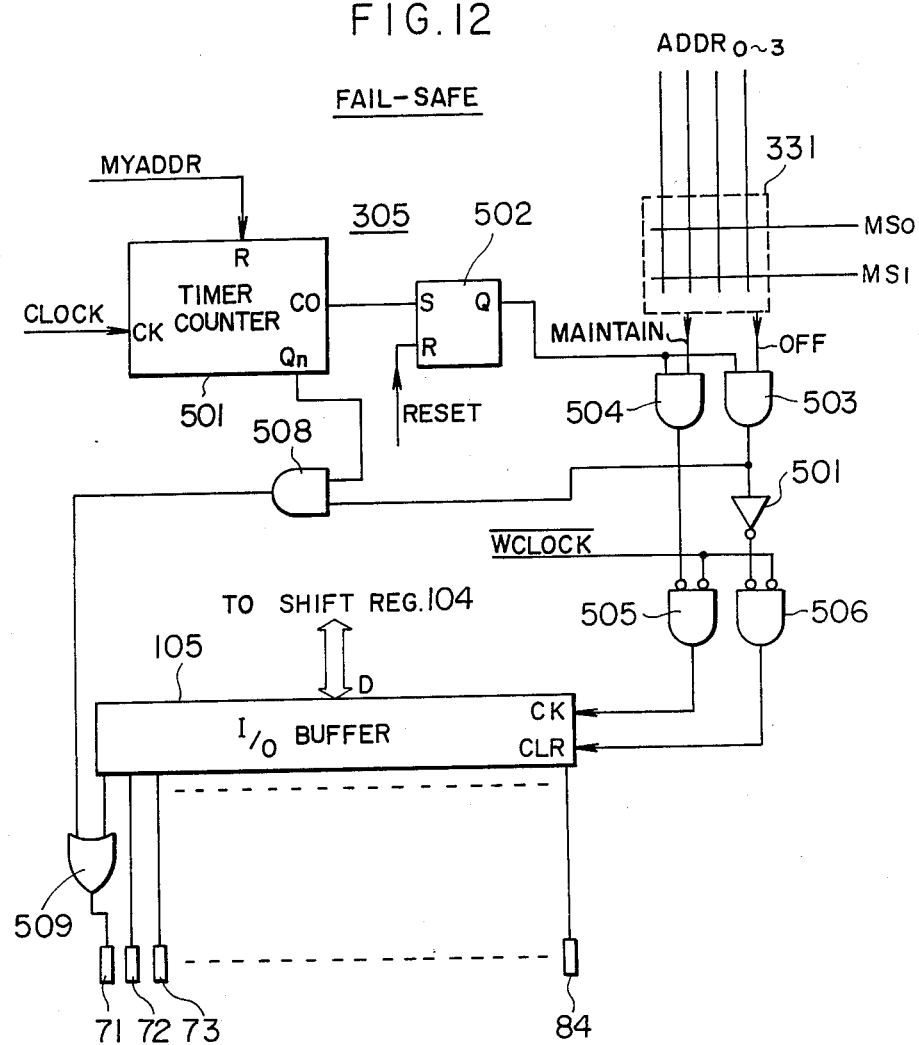
FIG. 12 is a schematic circuit diagram showing another example of the abnormality detection and fail-safe circuit.

FIG. 12 shows another example of the abnormality detecting circuit 305.

In this version of the abnormality detecting circuit, a flickering or flashing display indicative of the occurrence of an abnormality can be produced by making use of the final bit output $Q_n$ of the timer counter 501. The circuit configuration shown in FIG. 12 differs from the one shown in FIG. 11 in that an AND gate 508 and an OR gate 509 are additionally so connected that upon activation of the fail-safe function in the OFF mode, the final bit output $Q_n$ is derived at one of the output terminal pins 71 to 84 (the terminal pin 71 in the case of the illustrated example). Except for this feature, the other circuit configuration is the same as that shown in FIG. 11.

Since the counter 501 is constantly supplied with the clock signal CLOCK, this counter 501 continues the counting operation even after the flip-flop 502 has been set by the carry-out output signal CO produced due to the disappearance of the signal MYADDR for the predetermined period, as described hereinbefore. Accordingly, there are produced successively pulses (rectangular waveform) at the final bit output terminal $Q_n$ of the counter 501. Accordingly, by connecting to the terminal pin 71 a lamp such as an interior lamp of an automobile as the external load, the lamp starts flashing in response to the pulse signal supplied from the output terminal pin $Q_n$ through the gates 508 and 509 independent of whether the room lamp has been energized or deenergized until then, to thereby produce the flickering indicative of the occurrence of an abnormality. By the way, the purpose of the OR gate 509 used in the abnormality detection and display circuit shown in FIG. 12 is to allow the external load or lamp connected to the terminal pin 71 to be utilized also as the abnormality displaying lamp. In other words, the electric load to be connected to this terminal pin 71 is restricted to the interior lamp in order to assure that the flickering display indicating the abnormality will be detected. To obviate such restriction, a terminal pin destined only for deriving the abnormality detection signal to be displayed may be provided separately and the abnormality detection signal may be directly taken out through the AND gate 508. Although an additional terminal pin is required, the utility of the whole system can be correspondingly enhanced.

It is desirable that the period or interval PCO at which the carry-out output CO is produced by the timer counter 501 be selected sufficiently long as compared with the periodic interval PD at which a given CIM receives the data transmitted thereto. To this end, the period PCO should preferably be several hundred milliseconds or more, by way of example. However, in that case, a counter having a capacity of twenty or more bits will be required when the clock signal CLOCK of 4 MHz in frequency is employed. This means that a very expensive counter is required as the timer counter 501, increasing the costs of the system.

In this connection, it is noted that in the case of the embodiment shown in FIG. 4, the synchronizing circuit 102 includes a four-bit counter for dividing the clock frequency of 4 MHz to produce the divided clock signals $\phi_M$ and $\phi_S$ which are subsequently counted by the sequence counter 303. Under this circumstance, it is apparent that the carry-out output of this sequence counter 303 is supplied to the counter 501 as the clock signal CLOCK. In that case, the number of bits required for the counter 501 can be reduced down to eight bits, resulting in a further advantage.

(Automatic Transmission Function)

The automatic transmission is a function required when the CIMs are employed in a small scale transmission system to realize the one-to-one data transmission solely by the CIMs. To realize this function, the automatic transmission circuit 330 must be activated.

In the data transmission system illustrated in FIG. 2, the CCU (central control unit) is installed for controlling the data transfer or exchange among a plurality of LCUs (local control units), wherein the control of the whole system is performed by the micro-computer or micro-processor included in the CCU. When the MPU mode (micro-processing unit mode) is set at the CCU, the CIMs (communication interface modules) constituting the LCUs, respectively, as well as the CIM included in the CCU initiate the transmission of data TXD on a frame basis under the control of the micro-computer. On the other hand, when the DIO mode is set at the LCU, the data TXD transmitted from the CCU is received by the LCU as reception data RXD. Upon completion of reception of the data RXD, the LCU then starts the transmission of its own data TXD.

In this way, in the transmission system including the CIMs, the data transfer or exchange function is usually controlled by the CCU including the micro-computer or micro-processor. In contrast, in a system in which a pair of CIMs are coupled together by way of a single optical fiber cable OF without using the micro-computer, none of the CIMs can start the data transmission. In other words, the function of data transmission cannot be realized. Of course, some means may be provided to trigger the data transmitting operation of on of the CIMs, and the data transfer or exchange between the pair of CIMs may be carried out in a continuous manner.

In this connection, it should however be mentioned that the data transmission system of the type mentioned above inevitably suffers from the occurrence of data transmission errors due to noise. When a transmission error takes place, the data transfer operation is stopped at that instant. Thus, a stable and reliable data transmitting operation cannot be expected.

Further, it is noted that in the intra-car wiring system or the like, there is such an application where the data transmission system of a relatively small scale in which multiplexed data transmission takes place between a pair of LCUs or CIMs is sufficient, although some applications require the data transmission system of a large scale including a great number of LCUs, as described hereinbefore. As an example of the application of the small scale data transmission system, there may be mentioned, for example, a wiring system provided between a switch panel installed at a side of a steering wheel column and devices to be controlled such as head lights, horn and the like. Accordingly, a small scale data transmission system should desirably be used for such small scale wiring system, if possible.

It will however be apparent that if one of the paired CIMs is combined with a controller such as a microcomputer or the like to thereby impart the function of a CCU to said one CIM, or alternatively the pair of CIMs are provided with respective CCUs, the system is then very expensive when compared with the scale thereof, resulting in a disadvantage.

The automatic transmission function taught by the present invention is intended to deal with the problems elucidated above. According to an embodiment of the invention, a pair of CIMs are connected to each other through a transmission line to constitute a one-to-one LCU transmission system which is capable of effecting the multiplexed data transmission stably and realiably. Thus, the inexpensive data transmission system of small scale which has an excellent utility in the intra-car multiplexed wiring system or the like can be realized.

Figure 13:
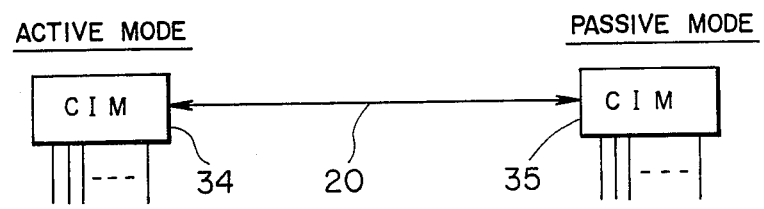
FIG. 13 is a schematic diagram showing an exemplary embodiment of a one-to-one CIM transmission system in which terminal control devices or CIMs are employed.

More specifically, the automatic transmission circuit 330 is arranged in such a manner that the initiation of the data transmitting operation of one CIM is caused to depend not only on the completed reception of data transmitted from the other CIM but also on a predetermined time lapse from the turn-on of the power supply and non-reception of data from the other CIM within a predetermined time after the completion of the data transmitting operation of the one CIM. Referring to FIG. 13 which shows in a much simplified form the one-to-one CIM (LCU) transmission system, one of the CIMs, e.g. CIM 34 is set to an automatic transmission effecting mode (hereinafter referred to as the active mode), while the other CIM denoted by 35 is set to an automatic transmission absence mode (hereinafter referred to as the passive mode). In order to set the CIM in the active mode, the address ADDR is set to one of "1" to "D" (corresponding to the DIO mode of the interface), while the mode select input $MS_1$ is set to "1" with $MS_0$ being set to "0" or "1", as will be seen in FIG. 5C. For setting the CIM in the passive mode, the address is set to one of "1" to "D" while the mode select input bit $MS_1$ is set to "0".

It is important to note that the role of the address playing in the data transmitting operation remains unvaried either in the active mode or passive mode.

In the one-to-one transmission system shown in FIG. 13, data is exchanged or transferred mutually between the CIM 34 and the CIM 35. In order to allow the data transmission, both of the CIMs 34 and 35 are set to the same address which is selected from the group of addresses "1" to "D". For this reason, the input port and the output port of the I/O buffer are mutually exchanged between the active mode and the passive mode.

The automatic transmission circuit 330 is constituted by a gate circuit and a flip-flop circuit. In a given CIM set to the active mode, when the count output of the sequence counter 303 which counts up at 256 steps in one cycle has attained, for example, the step S 254, a signal "LOAD" 49 is produced at a predetermined timing to cause, for example, a step S49 to be loaded in the sequence counter 303, to thereby permit the automatic intiation of the data transmitting operation of the given CIM when a predetermined time has elapsed from the last reception of data destined for that given CIM.

In this manner, by using the paired CIMs both set in the DIO mode and additionally set separately in the active mode and the passive mode, respectively, the one-to-one CIM transmission system can be realized, as shown in FIG. 13. The CIM 34 which is in the active mode operates in the DIO mode elucidated hereinbefore unless the automatic transmission circuit 330 thereof is activated. On the other hand, the CIM 35 whose automatic transmission circuit 330 is not activated performs, of course, the imparted functions in utterly the same manner as the CIMs which are in the DIO mode.

Next, description will be made of the operation of the one-to-one CIM transmission system (FIG. 13) which is constituted by a pair of CIMs each having the structure shown in FIG. 4. As described above, either of the CIMs 34 and 35 has the basic functions corresponding to those in the DIO mode (in particular, the functions of the CIM 35 are utterly the same as those in the DIO mode). Accordingly, the following description will be concentrated on the points which differ from the functions effected in the DIO mode.

When the power supply source of the transmission system is turned on by means of an engine key switch of a car, initialization is effected, whereby the output of the sequence counter 303 is set to S0. Subsequently, the counter 303 advances stepwise by counting the clock $\phi_M$. When the output of the counter 303 attains, for example, S25, operation of both the CIMs 34 and 35 are in the idle state, remaining thereafter in the waiting state awaiting the incoming signal. However, the counter 303 continues to count.

As is seen in FIG. 13, the system under consideration includes only a pair of CIMs 34 and 35 mutually coupled by way of the signal transmission line 20. Accordingly, so long as these two CIMs are in the idle state, any data transmitting operation will never be initiated.

However, the CIMs 34 and 35 employed in the one-to-one transmission system shown in FIG. 13 are each of the structure shown in FIG. 4, and the CIM 35 is set in the active mode.

On the other hand, the sequence counter 305 incorporated in each of the CIMs 34 and 35 continues to count the clock $\phi_M$ even in the idle state of the CIMs.

Thus, in the transmission system illustrated in FIG. 13, when the CIMs 34 and 35 enter the idle state following initialization, the automatic transmission circuit 330 of the CIM 34 which is set in the active mode is activated, although the CIM 35 in the passive mode remains in the idle state. This results in the generation of the signal "LOAD" 49 at a predetermined timing after the count output of the sequential counter 303 has attained S254, whereby S49 is loaded to the output of the sequential counter 303.

In both the CIMs 34 and 35, the transmitting operation is controlled in dependence on the count values or data of the sequential counter 303. When the sequence counter 303 of the CIM 34 has attained S49, the CIM 34 makes a jump from the idle state existing until then to a state referred to as DUMMY, which is followed by transmission of "0s" corresponding to 25 bits, being followed by the operation for transmitting the data TXD starting from S74, as the sequential counter 303 counts stepwise.

In this manner, once the data transmission from the CIM 34 is initiated, the data is received by the CIM 35 which is in the idle state, as a result of which data transmission takes place exchangeably between the CIMs 34 and 35 on a frame basis in the DIO mode, whereby the data transmission in the one-to-one transmission system composed of CIMs 34 and 35 is initiated.

Figure 14:
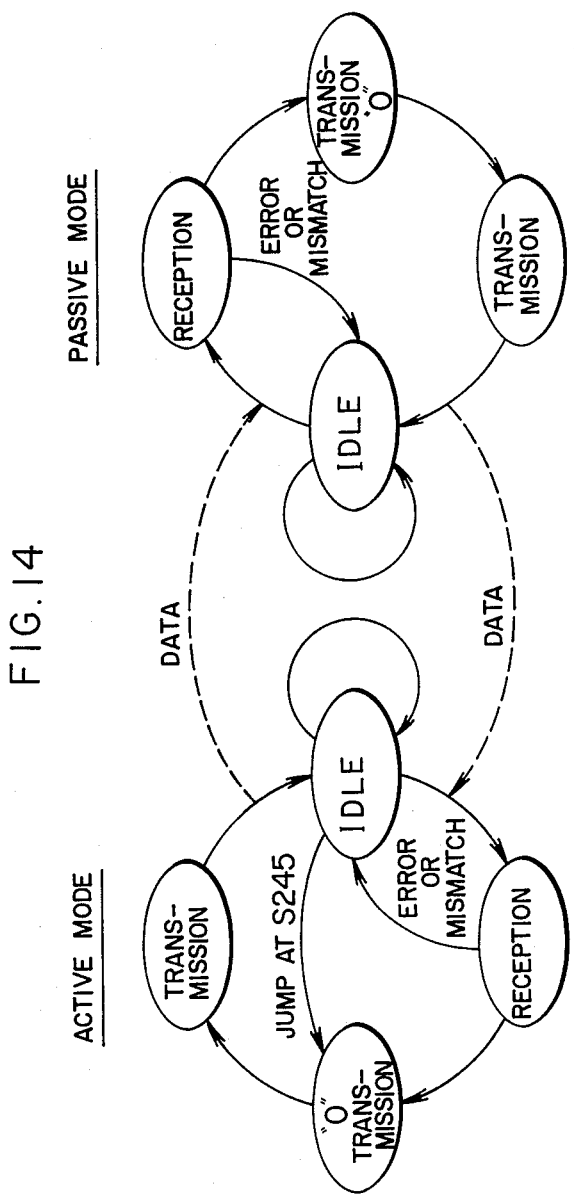
FIG. 14 is a view for illustrating the operation of the transmission system shown in FIG. 13.

The transition of the states of the CIMs 34 and 35 mentioned above is illustrated in FIG. 14.

When a transmission error is generated in the course of the steady half-duplex transmission between the CIMs 34 and 35, both the CIMs 34 and 35 are set to the idle state, resulting in the data transmitting operation being stopped.

However, since the CIM 34 is in the active mode at that time, S49 is loaded again in the sequence counter 305 at the time point when the count output thereof has attained S254, whereby the data transmission is started automatically.

In this manner, by constituting the one-to-one transmission system illustrated in FIG. 13 and selecting the active mode and the passive mode in the manner described above, stable data transmission can be constantly assured. This means that the data transmission system of a small scale can be realized inexpensively.

Now, description will be made of the mode selection and the change-over of the input/output ports of the I/O buffer 105.

As described hereinbefore, in the case of the exemplary embodiment of the present invention shown in FIG. 4, the active mode and the passive mode can be selectively set in the DIO mode, wherein the automatic transmission circuit 330 is activated in the active mode. The data transmitting functions as well as other circuit configuration in the DIO mode are held as they are. For example, in the DIO mode, the direction of the I/O buffer 105 is determined by the address signal which indicates the number of the output ports straightforwardly. In the DIO mode, addresses "1" to "D", each of four bits, are employed. When the address "1" is selected, one of the fourteen bits of the I/O buffer 105 serves as the output with 13 bits serving as the input port while upon selection of the address "D", thirteen bits constitute the output port with one bit constituting the input port.

In the one-to-one CIM system illustrated in FIG. 13, the data transfer cannot take place unless the addresses of both CIMs 34 and 35 coincide with each other.

Since the data sent out by one CIM, e.g. CIM 34, is necessarily received only by the CIM 35 while the data sent out from the CIM 35 can be received only by the CIM 34, efficiency in the data transmission will be reduced if the numbers of the input ports and the output ports of the I/O buffers 105 are same in both the CIM 34 and 35, thereby making it impossible to utilize the number of transmittable bits effectively. In other words, in the light of the essential nature of the data transmission, it cannot be said that the data transmission is validly performed in the one-to-one type transmission system, unless data of the input port of one CIM is received by the output port of the other CIM. Accordingly, it is desirable that the number of the input ports of the one CIM be equal to the number of the output ports of the other CIM, while the number of the output ports of the one CIM is set equal to the number of the input ports of the other CIM.

Accordingly, in the case of the embodiment being described, the changing-over of the input and output ports of the I/O buffer 105 in dependence on the addresses is effected in the manner similar to the CIM shown in FIG. 4 in the passive mode, while in the active mode, the address number is caused to correspond to the number of the input ports. By way of example, it is assumed that the CIMs 34 and 35 shown in FIG. 13 are both set to the address "1". On this assumption, in the CIM 35, one of 14 output ports of the I/O buffer 105 serves as the output port, while the remaining thirteen ports serve as input ports. In contrast, in the CIM 34 set in the active mode, thirteen output ports are available with a single input port. In this manner, the data transfer function of the one-to-one transmission system can be utilized to a maximum.

When the CIM is set in the active mode, the automatic transmitting operation is initiated when the sequence counter 303 has advanced to S254 after the power supply source has been turned on or after the data transmission has been interrupted.

Assuming now that the data transmission rate or speed determined by the clock $\phi_M$ is 250K bits/sec., the automatic transmitting operation takes place after the waiting time on the order of 1 msec. This waiting time can of course be set arbitrarily as a function of the maximum bit number of the sequence counter 303 and the clock frequency.

In the exemplary embodiment shown in FIG. 4, the time required for initiating the automatic transmission is set by making use of the sequence counter 303. This means in turn that the number of additional components required for the operation in the active mode is not increased appreciably, contributing to the decreasing in the manufacturing costs.

As will be appreciated from the foregoing description, selection of the CIM function in dependence on combinations of the inputs allows a great number of functions to be selected with a minimum number of inputs, rendering it possible to implement te CIM device in the form of LSI having the pins in a number reduced to a possible minimum. Thus, there has been proposed a transmission system in which CIMs having an improved general-purpose nature can be exchangeably used in a simplified manner.

We claim:

1. A terminal apparatus for a data transmission system having a central control unit including a microcomputer and at least one local control unit for connection to one or more I/O devices, comprising:
   a plurality of terminal pins which may be selectively connected as a group either to said microcomputer for an MPU mode of operation or to said I/O devices for an I/O mode of operation;
   a plural stage shift register having an input terminal for receiving data in serial form and an output terminal for supplying data in serial form, and including parallel input/output means for supplying data to and receiving data from said plural stages in parallel;
   a plurality of interface means, including an MPU interface and an I/O interface, connected to said shift register via said parallel input/output means, each of said interface means being connected to a respective group of predetermined shift register stages via said parallel input/output means;
   mode change-over means connected between said plurality of interface means and said plurality of terminal pins for connecting a selected one of said plurality of interface means to said terminal pins; and
   mode decoder means responsive to applied function control signals for controlling said mode change-over means to connect a selected interface means to said terminal pins to effect a desired mode of operation.

2. A terminal apparatus according to claim 1, further including sequence control means responsive to receipt of data at said input terminal of said shift register for controlling a sequence of operations of said shift register, including said parallel input/output means, according to the desired mode of operation as indicated by said applied function control signals.

3. A terminal apparatus according to claim 2, wherein said sequence control means includes sequence decoder means for generating control signals in a predetermined sequence for controlling said shift register and said parallel input/output means.

4. A terminal apparatus according to claim 3, further including automatic transmission means for controlling the operation of said sequence decoder means to vary said predetermined sequence of generation of control signals in dependence on the output of said mode decoder means.

5. A terminal apparatus according to claim 1, further including abnormality detecting means connected to receive the data supplied to the input terminal of said shift register for detecting an abnormality in said data.

6. A terminal apparatus according to claim 5, wherein said abnormality detecting means includes means responsive to said mode decoder means for controlling said parallel input/output means to hold or clear data provided from said plural stages of said shift register when an abnormality is detected in said data.

7. A terminal apparatus, for a data transmission system having a central control unit including a microcomputer and at least one local control unit for connection to one or more I/O devices, comprising:
   a plurality of terminal pins which may be connected to said microcomputer for an MPU mode of operation or to said I/O devices for an I/O mode of operation;
   a plural stage shift register having an input terminal for receiving data in serial form and an output terminal for supplying data in serial form, and including parallel input/output means for supplying data to and receiving data from said plural stages in parallel;
   a plurality of interface means connected to said shift register via said parallel input/output means, each of said interface means being connected to a respective group of shift register stages via said parallel input/output means;
   mode change-over means connected between said plurality of interface means and said plurality of terminal pins for connecting a selected one of said plurality of interface means to said terminal pins; and
   mode decoder means responsive to applied function control signals for controlling said mode change-over means to connect a selected interface means to said terminal pins to effect a desired mode of operation, wherein said function control signals applied to said mode decoder means comprise an address designating signal uniquely assigned to said terminal apparatus.

8. A terminal apparatus according to claim 7, wherein said function control signals applied to said mode decoder means further comprise a mode selecting signal.

* * * * *